United States Patent [19]

Ohta et al.

[11] Patent Number: 5,625,462
[45] Date of Patent: Apr. 29, 1997

[54] PANORAMA IMAGE PRODUCING METHOD AND APPARATUS WHICH CALCULATES A CUMULATIVE AMOUNT OF MOTION OF THE IMAGE

[75] Inventors: Masashi Ohta, Tokyo; Hiroshi Kobayashi, Chiba; Tsuneo Sekiya; Toshimichi Hamada, both of Tokyo; Kyoko Fukuda; Koji Iijima, both of Kanagawa, all of Japan

[73] Assignee: Sony Corporation, Tokyo, Japan

[21] Appl. No.: 396,173

[22] Filed: Feb. 27, 1995

Related U.S. Application Data

[62] Division of Ser. No. 133,377, Oct. 8, 1993, Pat. No. 5,548,409.

[30] Foreign Application Priority Data

| Oct. 9, 1992 | [JP] | Japan | 4-297771 |
| Oct. 9, 1992 | [JP] | Japan | 4-297772 |
| Oct. 9, 1992 | [JP] | Japan | 4-297773 |
| Oct. 9, 1992 | [JP] | Japan | 4-297774 |
| Oct. 23, 1992 | [JP] | Japan | 4-309451 |

[51] Int. Cl.$^6$ ............................. H04N 13/02; H04N 5/91
[52] U.S. Cl. ............................. 386/46; 348/37; 348/39
[58] Field of Search ........................... 358/208, 335, 358/209, 403; 348/36, 37, 38, 39

[56] References Cited

U.S. PATENT DOCUMENTS

| 5,138,460 | 8/1992 | Egawa . | |
| 5,262,867 | 11/1993 | Kojima | 358/209 |
| 5,270,831 | 12/1993 | Parulski et al. | 358/403 |
| 5,282,044 | 1/1994 | Misawa et al. | 358/222 |
| 5,371,602 | 12/1994 | Tsuboi et al. | 358/335 |
| 5,430,552 | 7/1995 | O'Callaghan | 358/335 |
| 5,510,830 | 4/1996 | Ohia et al. | 348/36 |
| 5,548,409 | 8/1996 | Ohta et al. | 358/335 |

FOREIGN PATENT DOCUMENTS

| 0339930 | 11/1989 | European Pat. Off. . |
| 0411440 | 2/1991 | European Pat. Off. . |
| WO87/05770 | 9/1987 | WIPO . |

OTHER PUBLICATIONS

Patent Abstracts of Japan vol. 14, No. 2 (E–868) 8 Jan. 1989, JP-A-01 251 962 (canon inc.) 6 Oct. 1989 *abstract.

*Primary Examiner*—Tommy P. Chin
*Assistant Examiner*—David R. Vincent
*Attorney, Agent, or Firm*—William S. Frommer; Alvin Sinderbrand

[57] ABSTRACT

A method and an apparatus by which a panorama image is produced with a high degree of accuracy from an image signal wherein an image signal produced by a CCD imaging element is recorded onto a video tape by way of a camera signal processing circuit, a recording signal processing circuit, a recording/reproduction amplifier and so forth. Meanwhile, a microcomputer calculates of a motion vector of an image from the output of a motion vector detector to which the image signal from the CCD imaging element is inputted, and controls a video subcode processor so that motion vector information may be recorded onto the video tape. The motion vector information is reproduced from the video tape together with the image signal, and a plurality of images are formed from the thus reproduced image signal and joined together in accordance with the motion vector information to produce a panorama image.

7 Claims, 18 Drawing Sheets

FIG. 4

| | BIT | |
|---|---|---|
| WORD 0 | BIT 7<br>6<br>5<br>4<br>3<br>2<br>1<br>0 | 0 : PANNING OFF  1 : PANNING ON<br>} RESERVED |
| WORD 1 | BIT 7<br>6<br>5<br>4<br>3<br>2<br>1<br>0 | MOTION VECTOR X-AXIS COMPONENT<br>(SIGN 1 BIT, INTEGRAL PORTION 7 BITS, DECIMAL PORTION 2 BITS) |
| WORD 2 | BIT 7<br>6<br>5<br>4<br>3<br>2<br>1<br>0 | MOTION VECTOR Y-AXIS COMPONENT<br>(SIGN 1 BIT, INTEGRAL PORTION 7 BITS, DECIMAL PORTION 2 BITS) |

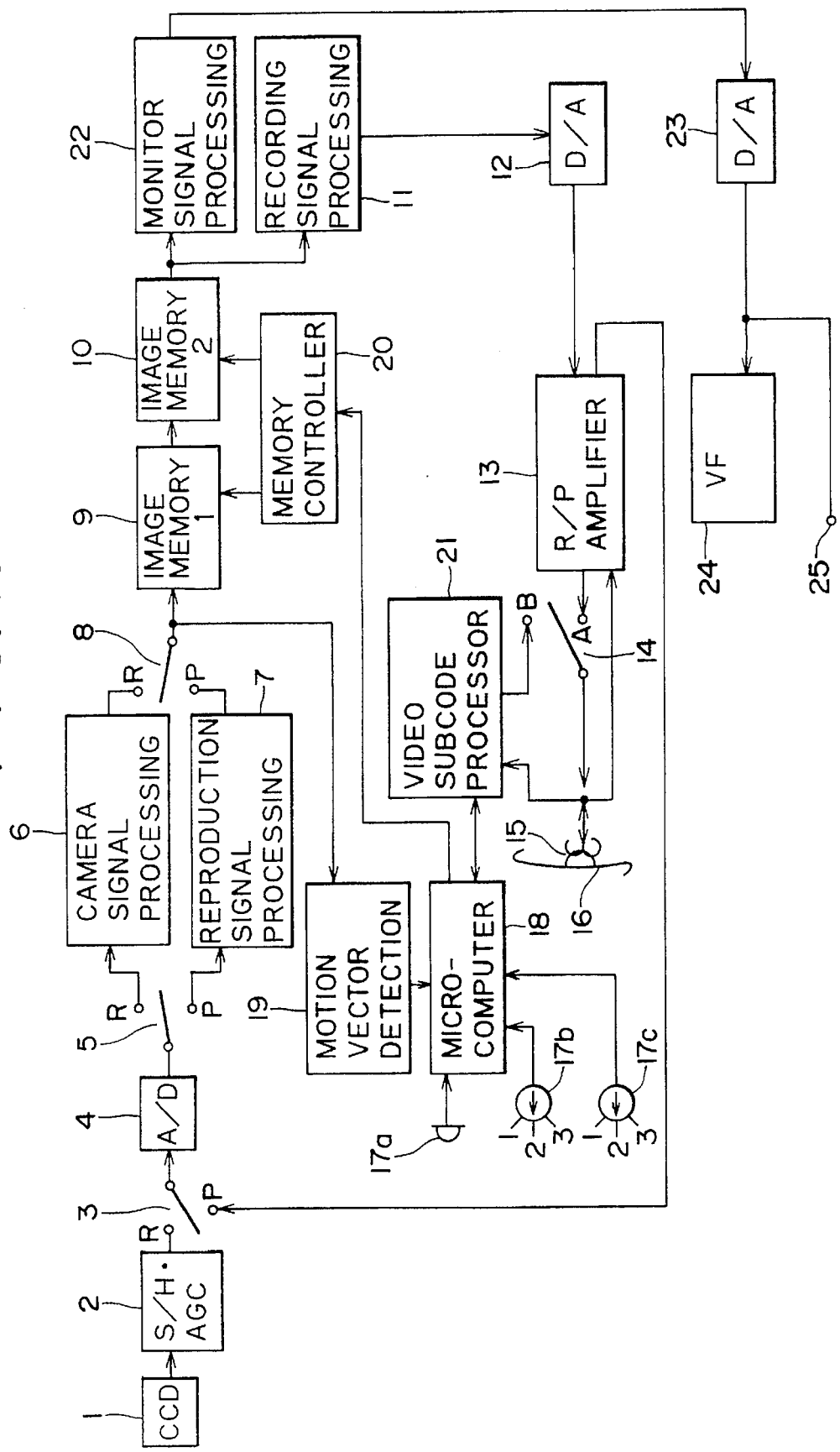

FIG.13(b) ① 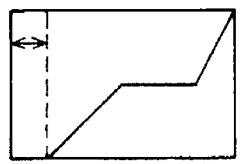
FIG.13(c) ② 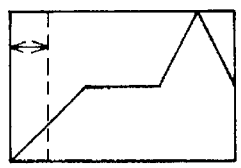
FIG.13(d) ③ 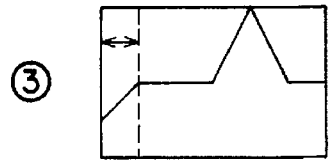
FIG.13(e) ④ 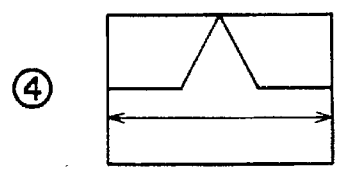
FIG.13(f) ⑤ 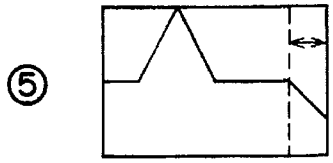
FIG.13(g) ⑥ 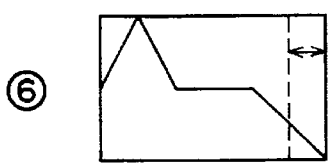
FIG.13(h) ⑦ 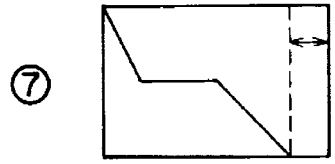

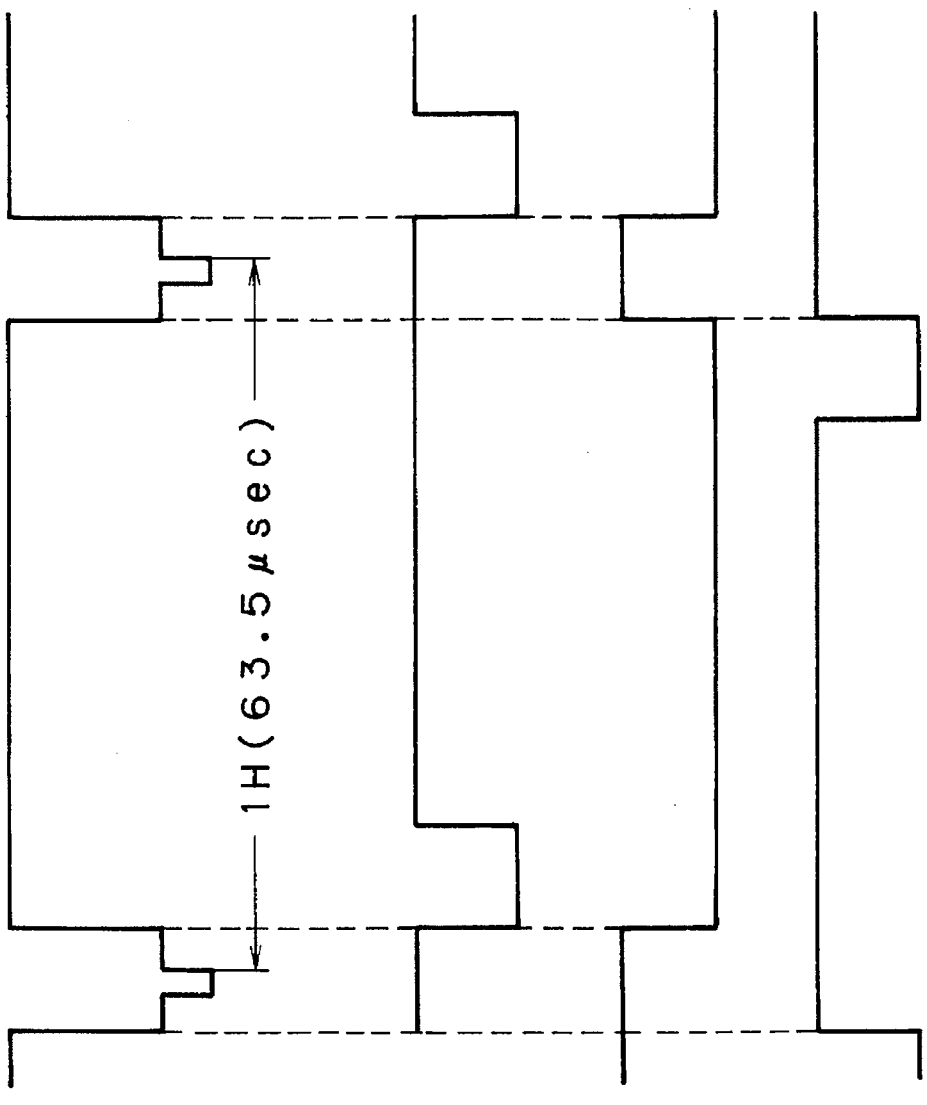

FIG.16(b) ① 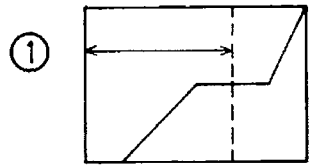
FIG.16(c) ② 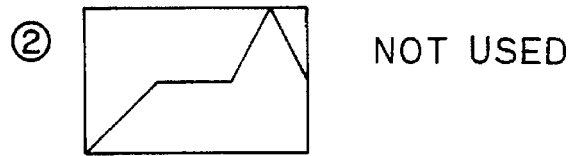 NOT USED
FIG.16(d) ③ 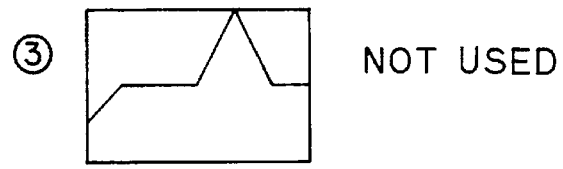 NOT USED
FIG.16(e) ④ 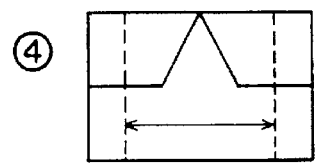
FIG.16(f) ⑤ 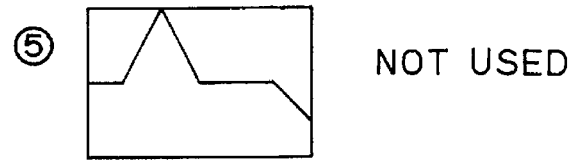 NOT USED
FIG.16(g) ⑥ 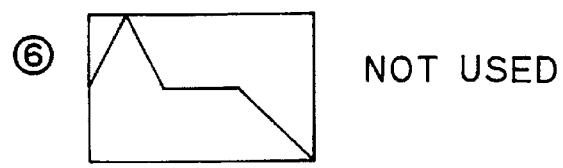 NOT USED
FIG.16(h) ⑦ 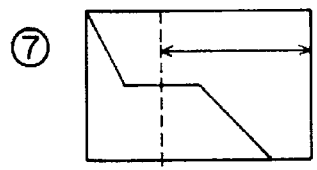

① ④ ⑦

PANORAMA IMAGE PRODUCING METHOD AND APPARATUS WHICH CALCULATES A CUMULATIVE AMOUNT OF MOTION OF THE IMAGE

This application is a division of application Ser. No. 08/133,377, filed Oct. 8, 1993, now U.S. Pat. No. 5,548,409.

BACKGROUND OF THE INVENTION

1. Field of the Invention

This invention relates to a method of and an apparatus for producing and recording a panorama image from an image signal produced by imaging a subject by means of an imaging element such as a CCD (charge coupled device) apparatus.

2. Description of the Related Art

Apparatus wherein an image signal produced by imaging a subject by means of an imaging element such as a CCD apparatus is recorded onto a recording medium and is supplied to a viewfinder and the thus recorded image signal is reproduced and supplied to a monitor are known and used conventionally. A typical one of such apparatus is a video tape recorder integrated with a camera (hereinafter referred to as video camera-tape recorder) or an electronic still camera.

In such a conventional video camera-tape recorder or a like apparatus as mentioned above, the image signal supplied to the viewfinder or the monitor represents the subject for each screen, and accordingly, also the image displayed in the viewfinder or on the monitor represents the subject for each screen. Consequently, the image displayed at a time is limited to an image of a narrow area of the subject, and it is impossible for the user to see a wide scene or spectacle at a glance.

Thus, a panorama image producing apparatus has been proposed wherein a subject is imaged to produce an image signal and a plurality of images formed from the image signal are joined together to produce a panorama image. The panorama image producing apparatus photographs a subject while being panned or tilted and controls the width with which a plurality of images are joined together in accordance with a motion vector of the image. Accordingly, in order to produce a panorama image with a high degree of accuracy, it is necessary to accurately detect a motion vector of an image.

SUMMARY OF THE INVENTION

It is an object of the present invention to provide a method and an apparatus by which a panorama image signal is produced from an image signal produced by imaging a subject by means of an imaging element such as a CCD apparatus.

It is another object of the present invention to provide an image signal recording apparatus and an image signal recording and reproducing apparatus wherein a panorama image can be produced from an image signal produced by imaging a subject by means of an imaging element such as a CCD apparatus.

It is a further object of the present invention to provide an image signal recording apparatus and an image signal recording and reproducing apparatus wherein a panorama image can be produced with a high degree of accuracy from an image signal reproduced by means of a video camera-tape recorder.

It is a still further object of the present invention to provide a motion vector detecting method and apparatus by which a motion vector can be detected accurately upon production of a panorama image from an image signal produced by imaging a subject by means of an imaging element such as a CCD element.

It is a yet further object of the present invention to provide a panorama image producing method and apparatus by which a panorama image of a high quality can be obtained by varying the screen dividing mode in response to an image obtained by photographing.

It is a yet further object of the present invention to provide a panorama image producing method and apparatus by which a panorama image which has a minimized degree of distortion at a joining portion thereof can be produced.

It is a yet further object of the present invention to provide an imaging and recording apparatus by which a panorama image can be produced and a proceeding condition of imaging for production of a panorama image can be visually observed.

In order to attain the objects described above, according to an aspect of the present invention, there is provided an apparatus for recording an image signal, which comprises imaging means for imaging a subject, motion vector detecting means for detecting motion vector information from an image signal from the imaging means, and recording means for recording the motion vector information from the motion vector detecting means onto a recording medium together with the image signal from the imaging means. The motion vector information may be recorded into a video subcode area of the recording medium. Panning information of the apparatus may be additionally recorded onto the recording medium.

According to another aspect of the present invention, there is provided an apparatus for recording and reproducing an image signal, which comprises imaging means for imaging a subject, motion vector detecting means for detecting motion vector information from an image signal from the imaging means, recording means for recording the motion vector information from the motion vector detecting means onto a recording medium together with the image signal from the imaging means, reproducing means for reproducing the image signal and the motion vector information from the recording medium, image forming means for forming a plurality of successive images from the image signal reproduced by the reproducing means, joining means for joining at least portions of the images from the image forming means to form a panorama image, and control means for controlling the width of the portions of the images with which the images are joined together by the joining means. The recording means may additionally record panning information onto the recording medium whereas the reproducing means reproduces also the panning information from the recording medium, and the control means automatically retrieves the panning information to cause the joining means to automatically produce a panorama image.

With the image signal recording apparatus and the image signal recording and reproducing apparatus, a panorama image with a high degree of accuracy can be produced from an image signal reproduced from a recording medium such as a video tape. Further, by automatically retrieving the panning information recorded on the recording medium, a panorama image can be produced automatically. Further, since a panorama image can be produced form an image signal produced by photoelectric conversion of a subject, a wide scene or spectacle can be seen at a glance. Furthermore, since it is not required to detect a motion vector from an image signal whose signal to noise ratio has been degraded by way of a recording and reproducing process, the accuracy in production of a panorama image is enhanced. In addition, where panning information is additionally recorded, a panning image can be retrieved readily upon reproduction, and a panorama image can be produced automatically from such panning image.

According to a further aspect of the present invention, there is provided a method of producing a panorama image by joining at least portions of a plurality of images formed from an image signal produced by imaging a subject, wherein the position at and/or the width with which portions of each two adjacent images are joined with each other are variable.

According to a still further aspect of the present invention, there is provided an apparatus for producing a panorama image from an input image signal produced by imaging a subject, which comprises image storage means for storing the input image signal for a plurality of images, read means for reading the image signal from the image storage means, joining means for joining at least portions of the images of the image signal read out from the storage means to form a panorama image, and control means for controlling the timing to enable storage of the input image signal into the image storage means thereby to control the position at and/or the width with which portions of each two adjacent images are joined with each other.

According to a yet further aspect of the present invention, there is provided a method of producing a panorama image by joining at least portions of a plurality of images formed from an image signal produced by imaging a subject, wherein portions of the images originating from a central portion of a lens for forming an image of the subject on an imaging element are joined with each other.

According to a yet further aspect of the present invention, there is provided an apparatus for producing a panorama image, which comprises a lens, an imaging element for imaging a subject by way of the lens, storage means for selectively storing, from an image signal outputted from the imaging element, portions of a plurality of images of the image signal originating from a central portion of the lens, read means for reading the image signal from the image storage means, and joining means for joining those portions of the images of the image signal read out from the storage means which originate from the central portion of the lens to form a panorama image.

With the panorama image producing methods and apparatus, since the position at and/or the width with which portions of each two adjacent images are joined with each other are variable in response to the images, the position of each joining portion and the distance between joining portions of a panorama image can be varied. Accordingly, a panorama image of a high quality can be produced. Further, since a panorama image can be produced from an image signal produced by photoelectric conversion of a subject, a wide scene or spectacle can be seen at a glance. Furthermore, by varying a joining location or the width of a portion to be extracted from an image in accordance with the photographed images, a panorama image of a high quality can be obtained. Further, since those portions of the images originating from the central portion of the lens are used, a panorama image whose distortion at a joining portion is little can be obtained. Furthermore, since those portions of the images originating from the central portion of the lens are extracted automatically, the user need not pay attention to a joining portion.

According to a yet further aspect of the present invention, there is provided a method of producing a panorama image by joining at least portions of a plurality of images formed from an image signal produced by imaging a subject, wherein the width with which portions of each two adjacent images are joined with each other is controlled in response to a motion vector of an image.

According to a yet further aspect of the present invention, there is provided an apparatus for producing a panorama image from an input image signal produced by imaging a subject, which comprises image storage means for storing the input image signal, motion vector detecting means for detecting a motion vector of an image from the input image signal, and control means for controlling the storage position of the image storage means in response to the motion vector detected by the motion vector detecting means to control the width with which portions of each adjacent images are joined with each other in accordance with the motion vector of the image. The input image signal may be produced by imaging a subject during panning motion of the apparatus. Alternatively, the input image signal may be produced by imaging a subject during tilting motion of the apparatus.

With the panorama image producing method and apparatus, a single wide angle still image can be produced by joining portions of images with each other using motion vectors of the images. Thus, only by panning or tilting the apparatus to image a subject, such a panorama image as can be obtained using a wide angle lens can be obtained. Further, comparing with a panorama image obtained by simply joining two still images to each other, in a panorama image obtained by the panorama image producing method and apparatus of the present invention, the distortion caused by a lens at a joining portion between two images is reduced significantly.

According to a yet further aspect of the present invention, there is provided a motion vector detecting method for a panorama image producing apparatus wherein, when a plurality of images formed from an image signal produced by imaging a subject are to be joined together to form a panorama image, the width with which the images are joined together is controlled in response to a motion vector of an image, wherein a motion vector having a vertical component lower than a predetermined value is used as a motion vector upon panning imaging.

According to a yet further aspect of the present invention, there is provided a motion vector detecting apparatus for a panorama image producing apparatus wherein, when a plurality of images formed from an image signal produced by imaging a subject are to be joined together to form a panorama image, the width with which the images are joined together is controlled in response to a motion vector of an image, which comprises motion vector detecting means for detecting a motion vector of an image, and means for detecting, from the output of the motion vector detecting means, that motion vector which has a vertical component lower than a predetermined value.

According to a yet further aspect of the present invention, there is provided a motion vector detecting method for a panorama image producing apparatus wherein, when a plurality of images formed from an image signal produced by imaging a subject are to be joined together to form a panorama image, the width with which the images are joined together is controlled in response to a motion vector of an image, wherein a motion vector having a horizontal component lower than a predetermined value is used as a motion vector upon tilting imaging.

According to a yet further aspect of the present invention, there is provided a motion vector detecting apparatus for a panorama image producing apparatus wherein, when a plurality of images formed from an image signal produced by imaging a subject are to be joined together to form a panorama image, the width with which the images are joined together is controlled in response to a motion vector of an image, which comprises motion vector detecting means for detecting a motion vector of an image, and means for detecting, from the output of the motion vector detecting means, that motion vector which has a horizontal component lower than a predetermined value.

With the motion vector detecting methods and apparatus, by making use of the information of "vertical motion ≈0" or "horizontal motion ≈0" obtained by motion vector detection, wrong discrimination in motion vector detection upon panning photographing or tilting photographing can be reduced. Thus, even when the image exhibits motion of a subject or is low in signal to noise ratio or contrast, wrong detection of a motion vector of the image can be reduced. As a result, a panorama image with a high degree of accuracy can be produced.

According to a yet further aspect of the present invention, there is provided an apparatus for recording an image signal, which comprises imaging means for imaging a subject, motion detecting means for detecting motion of an image from an image signal outputted from the imaging means, joining means for joining a plurality of images formed from the image signal from the imaging means to form a panorama image, calculating means for calculating, in response to an output of the motion detecting means, a cumulative amount of motion of the image after a point of time at which imaging for production of a panorama image is started and calculating an amount of motion of the image necessary to produce a panorama image, and displaying means for displaying a proceeding condition of imaging for production of a panorama image in response to an output of the calculating means. The motion detecting means may include a motion vector detector for detecting a motion vector between images of different fields by image processing. Alternatively, the motion detecting means may include an angular velocity sensor. The displaying means may include a viewfinder in which the proceeding condition of imaging for production of a panorama image is displayed.

With the image signal recording apparatus, since motion of an image is detected and displayed in the viewfinder or the like when panorama photographing is performed, the user of the apparatus can know a proceeding condition or an end of the panorama photographing from the display. Further, the user can adjust the photographing speed.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 4 is a table illustrating an example of bit allocation of a video subcode in the panorama image producing apparatus of FIG. 3;

FIG. 12 is a block diagram showing a modified panorama image producing apparatus;

FIGS. 13(a) to 13(i) are diagrammatic views illustrating a first screen dividing mode of the panorama image producing apparatus of FIG. 12;

FIG. 14 is a time chart illustrating the relationship between an image signal and write enable signals at the first, fourth and seventh fields in the panorama image producing apparatus of FIG. 12;

FIGS. 16(a) to 16(i) are diagrammatic views illustrating a third screen dividing mode of the panorama image producing apparatus of FIG. 12;

DETAILED DESCRIPTION OF THE PREFERRED EMBODIMENT

Figure 1:
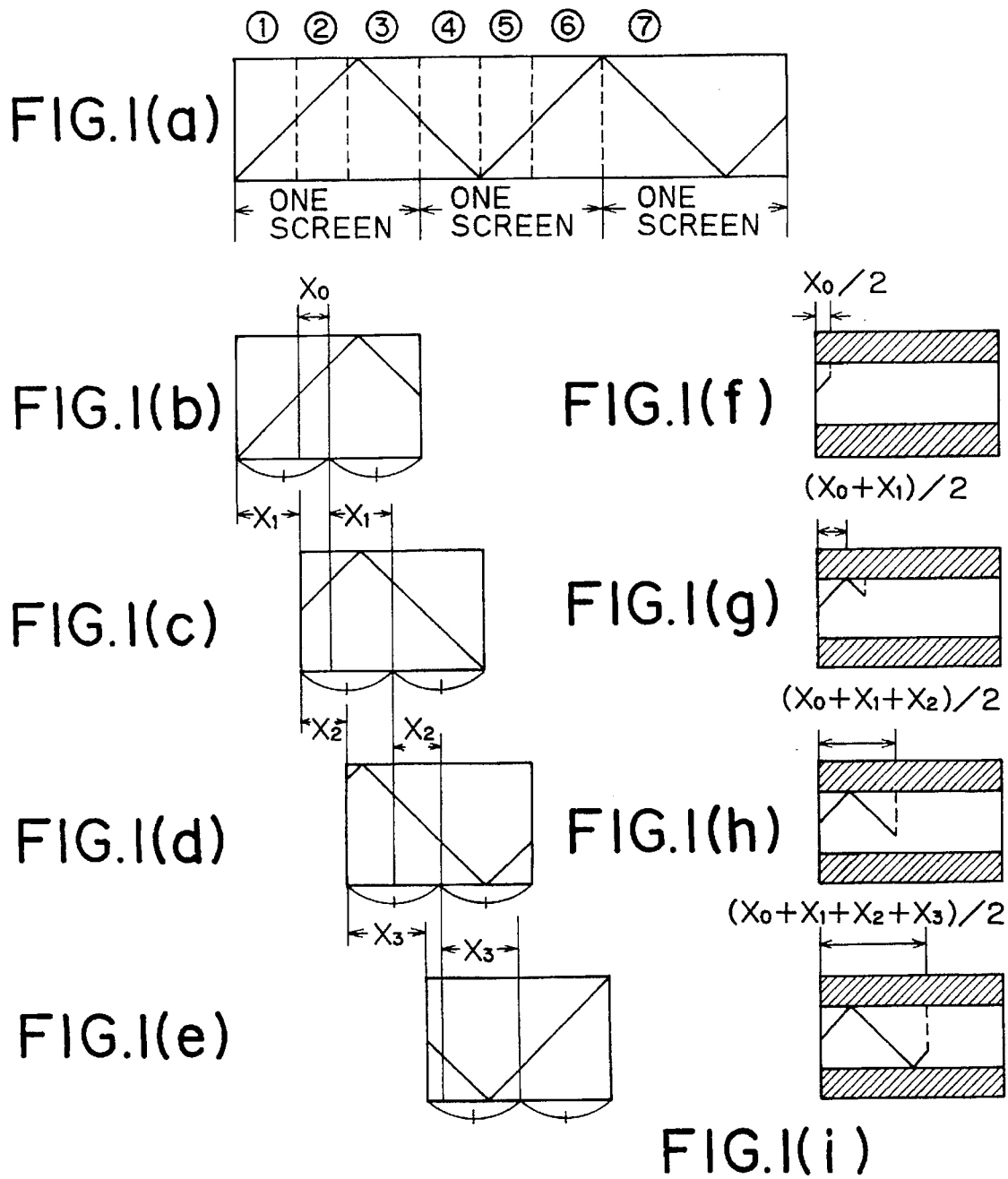
FIGS. 1(a) to 1(i) are diagrammatic views illustrating a principle of production of a panorama image according to the present invention.

FIGS. 1(a) to 1(i) illustrates a principle of production of a panorama image according to the present invention. Referring first to FIG. 1(a), there is shown a relationship between a subject and an image. Here, the subject includes a regular repeat pattern of a triangle and is shown for three screens in a horizontal direction. Numbers in circles indicated at the top of FIG. 1(a) represent field numbers when panning is performed from the left to the right of the subject. In short, while the field of view moves by a six field distance from the first field to the seventh field, panning for two screens is performed. Then, a single panorama image is produced from the images of the two screens.

FIG. 1(b) indicates an image of the first field. A portion of the width $x_0$ on the left side with respect to the center of the screen is extracted and is written into an image memory while being reduced to one half in size both in a horizontal direction and a vertical direction. Such reduction in size is performed in order to allow a panorama image from two screens to be produced in one screen. FIG. 1(f) shows the image thus written in the image memory. The top and bottom portions of the screen each having one fourth height are blanked while the image is written into the remaining central portion of the screen having one half height. Here, the portion of the width $x_0$ indicated in FIG. 1(b) is written at a portion of the width $x_0/2$ from the left end of the screen. In order to extract the portion of the width $x_0$ from the screen of FIG. 1(b) and reduce it to one half in the horizontal and vertical directions, the image memory is used. For example, when the the portion of the image of FIG. 1(b) is to be written into the image memory, every other picture element of the image signal is supplied to the image memory.

FIG. 1(c) shows an image of the second field. Since the image of the second field is displaced by a distance $x_1$ in the horizontal direction from the image of the first field, a portion of the image of the width $x_1$ from the center of the screen is extracted and written into the image memory while being reduced to one half in size both in the horizontal direction and the vertical direction. FIG. 1(g) shows the portion of the image written in the image memory. Here, the portion of the image is written at a portion of the width $x_1/2$ in the image memory next to the portion written at the stage of FIG. 1(f).

Similarly, FIG. 1(d) shows an image of the third field. Since the image of the third field is displaced by a distance $x_2$ in the horizontal direction from the image of the second field, a portion of the image of the width $x_2$ from the center of the screen is extracted and written into the image memory while being reduced to one half in size both in the horizontal direction and the vertical direction. FIG. 1(h) shows the portion of the image written in the image memory. Here, the portion of the image is written at a portion of the width of $x_2/2$ in the image memory next to the portion written at the stage of FIG. 1(g).

By repeating such a sequence of operations as described above up to the seventh field, a panorama image from two screens can be produced in one screen. However, since the portion of the width $x_0$ has been extracted and written into the image memory in the first field, the width of a portion of the image in the seventh field is reduced as much. Here, completion of writing of a panorama image can be detected from the fact that the write address for the image memory reaches a value corresponding to the right end of the screen or from a timing of a write enable signal which will be hereinafter described. It is to be noted that representations of the fifth and following screens are omitted in the drawings.

Figure 2:
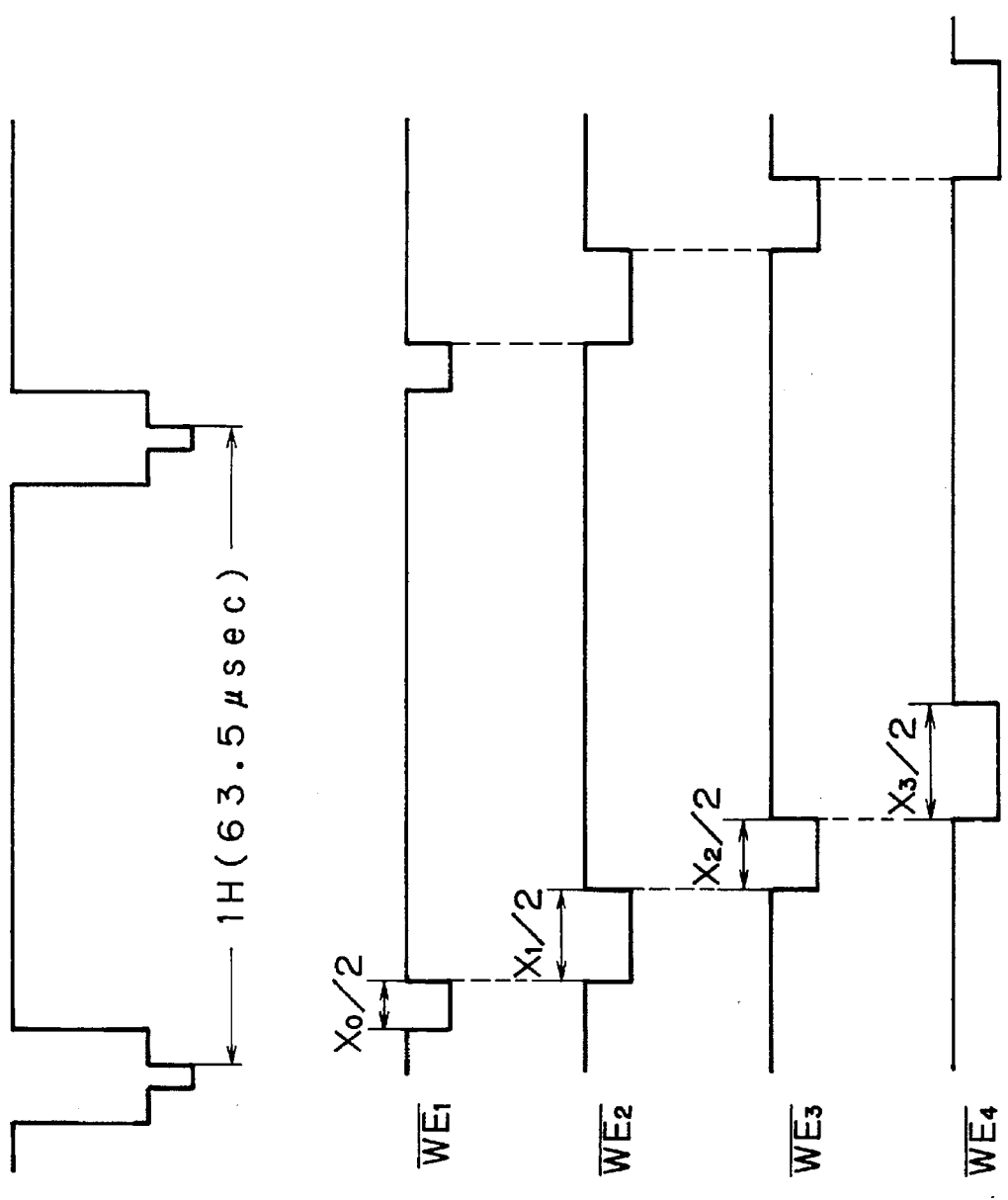
FIG. 2 is a time chart illustrating the timing relationship between a horizontal write enable signal for an image memory and a horizontal synchronizing signal of an image signal.

FIG. 2 is a time chart illustrating the timing relationship between a write enable signal (WE: indicated in the negative logic in FIG. 2) for the image memory described above with reference to FIGS. 1(a) to 1(i) and an image signal for one horizontal scanning period. The waveform (a) in FIG. 2 shows the image signal while the waveforms (b) to (e) show write enable signals $\overline{WE}_1$ to $\overline{WE}_4$ for the first to fourth fields of FIG. 1, respectively. When the write enable signal is at the low level, writing into the image memory is performed.

Also with regard to the vertical direction, such writing control as seen from FIGS. 1(f) to 1(i) can be achieved by applying a similar write enable signal to the image memory.

Figure 3:
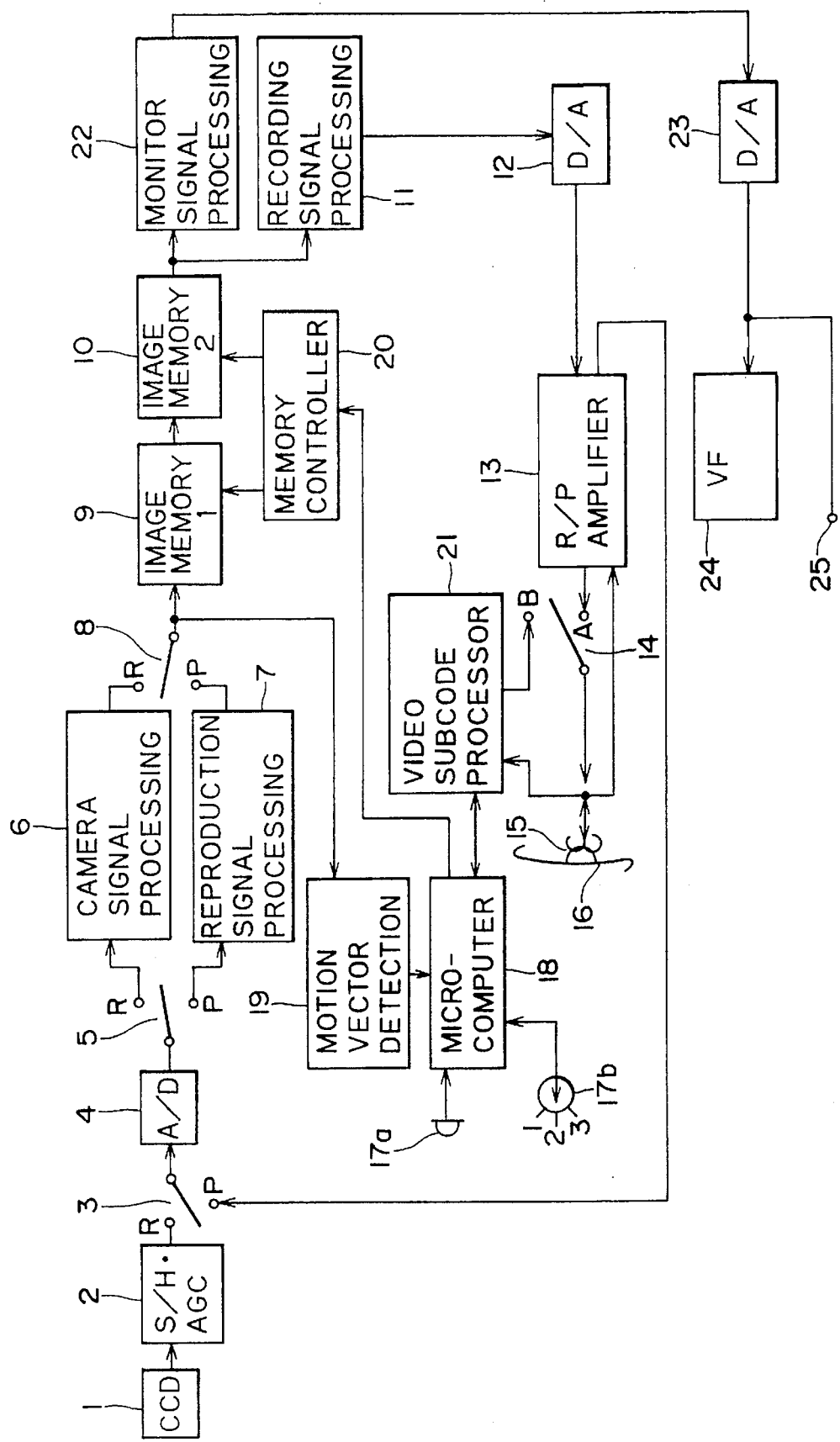
FIG. 3 is a block diagram of a panorama image producing apparatus showing a preferred embodiment of the present invention.

FIG. 3 shows a panorama image producing apparatus to which the present invention is applied. The panorama image producing apparatus serves as an image signal recording and reproducing apparatus in the form of video camera-tape recorder, which has a panorama image producing function so that it can produce a panorama image or panorama image signal upon recording or reproduction onto or from a video tape.

Referring to FIGS. 1(a) to 1(i), 2 and 3, when recording is to be performed, the user will manually operate a mode switch 17b to put the panorama image producing apparatus into a mode in which it produces a panorama image upon recording, and will manually operate a REC (recording) button (not shown) into an on-state to start photographing. Then, when panning photographing is to be performed, the user will manually operate a panorama switch 17a into an on-state.

An image of a subject is formed on a CCD imaging element 1 by way of a lens not shown and converted into an image signal by the CCD imaging element 1. The image signal is inputted by way of a sample hold AGC (automatic gain control) circuit 2 and a terminal R of a switch 3 to an analog to digital (A/D) converter 4, in which it is converted into a digital signal.

The image signal in the form of a digital signal is inputted from a terminal R of another switch 5 to a camera signal processing circuit 6, in which camera signal processing such as gamma correction, white balance adjustment and so forth is applied to the image signal. Thereafter, the image signal is stored into a first image memory 9 by way of a terminal R of a further switch 8 under the control of a memory controller 20. The image signal written in the first image memory 9 corresponds to images in FIGS. 1(b) to 1(e).

Meanwhile, the output of the switch 8 is inputted to a motion vector detector 19, in which motion vector detection data, that is, a minimum value of differences at representative points, an address of the minimum value and so forth are detected and sent to a microcomputer 18. The microcomputer 18 thus calculates a motion vector from the motion vector detection data outputted from the vector detector 19 and outputs a control signal to the memory controller 20. Here, the motion vector corresponds to the movements $x_1$ to $x_3$ in the horizontal direction in FIGS. 1(b) to 1(e). It is to be noted that construction and operation of the motion vector detector 19 and operation of the microcomputer 18 will be hereinafter described in detail.

The memory controller 20 controls the read address of the first image memory 9 in response to the control signal outputted from the microcomputer 18 to perform extraction and reduction processing of the screens shown in FIGS. 1(b) to 1(e) and inputs a resulted image signal to a second image memory 10. The second image memory 10 is controlled by the memory controller 20, and write control for the second image memory 10 illustrated in FIGS. 1(f) to 1(i) is performed when write enable signals $\overline{WE}_1$ to $\overline{WE}_4$ illustrated in the waveform diagrams (b) to (e) of FIG. 2 and corresponding memory addresses are supplied to it.

A panorama image signal is written into the second image memory 10 in this manner. The panorama image signal stored in the second image memory 10 is read out and then converted into a composite image signal by a monitor signal processing circuit 22, whereafter it is converted into an analog image signal by a digital to analog (D/A) converter 23 and supplied to a viewfinder 24 so that a panorama image is displayed in the viewfinder 24. Meanwhile, if the panorama image signal is supplied to an external monitor or printer (not shown) from a video output terminal 25, then a panorama image is similarly displayed on the external monitor or by the external printer.

Further, the panorama image signal read out from the second image memory 10 is processed by recording signal processing such as emphasis, FM modulation of a brightness signal and low frequency band conversion of a chroma signal by a recording signal processing circuit 11. Then, an FM brightness signal and a low frequency band conversion chroma signal thus obtained are converted into analog signals by a digital to analog (D/A) converter 12 and then supplied by way of a recording/reproduction amplifier 13 and a terminal A of a switch 14 to a video head 15, by which it is recorded onto a video tape 16.

The panorama image signal recorded on the video tape 16 is reproduced by the video head 15 and inputted from the recording/reproduction amplifier 13 to the analog to digital converter 4 by way of a terminal P of the switch 3. The image signal is thus converted into a digital signal by the analog to digital converter 4 and processed by reproduction signal processing such as FM demodulation and de-emphasis by a reproduction signal processing circuit 7. When necessary, the output signal of the reproduction signal processing circuit 7 is subsequently processed by digital processing such as noise removal processing by the first image memory 9 and the second image memory 10. Then, the digital signal after such processing is converted into a composite image signal by the monitor signal processing circuit 22 and then converted into an analog image signal by the digital to analog converter 23, whereafter it is supplied to the viewfinder 24 and the video output terminal 25.

Subsequently, operation of the panorama image producing apparatus when a panorama image is to be produced upon reproduction of the video tape 16 will be described.

In this instance, the user will manually operate the mode switch 17b to put the panorama image producing apparatus into a mode in which a panorama image is produced upon reproduction, and then manually operate the REC button (not shown) into an on-state to start photographing. Then, when panning photographing is to be performed, the user will manually operate the panorama switch 17a into an on-state.

In this instance, the processing until the output of the CCD imaging processing 1 is inputted to the terminal R of the switch 8 is similar to that when a panorama image is produced upon recording. The output of the switch 8 is inputted by way of the first image memory 9 and the second image memory 10 to the recording signal processing circuit 11 and then supplied by way of the recording/reproduction amplifier 13 and the terminal A of the switch 14 to the video head 15 so that it is recorded onto the video tape 16. Here, the reason why the image signal is passed through the first image memory 9 or the second memory 10 is that it is intended to adjust the image signal to a delay time of one field required for a motion vector detecting operation.

Further, the output of the switch 8 is supplied to the motion vector detector 19, in which motion vector detection data, that is, a minimum value of differences among representative points, an address of the minimum value and so forth are detected and sent to the microcomputer 18. The microcomputer 18 thus calculates a motion vector from the output of the vector detector 19 and supplies such motion vector information to a video subcode processor 21. Further, the microcomputer 18 detects manual operation of the panorama switch 17a for panning photographing, and supplies a panning ID (identification) signal to the video subcode processor 21.

The video subcode processor 21 produces a video subcode from the motion vector information and the panning ID signal outputted from the microcomputer 18 and supplies the video subcode to the recording head 15 by way of a terminal B of the switch 14. Changing over of the switch 14 is performed for each recording track. As a result, a video subcode is recorded onto a video tape in an alternate relationship with an image signal for each track. Such video subcode should be recorded, when the video camera-tape recorder of the panorama image producing apparatus is, for example, an 8 mm video tape recorder, at a portion of the video tape between recorded portions of a PCM audio signal and an FM image signal.

FIG. 4 illustrates an example of bit allocation of the video subcode. Referring to FIG. 4, the video subcode is constituted from 3 words 0, 1 and 2. The bit 7 of the word 0 indicates on/off of panning; bits from the bit 3 of the word 0 to the bit 2 of the word 1 indicate an X-axis component (horizontal component) of a motion vector; and bits from the bit 1 of the word 1 to the bit 0 of the word 2 indicate a Y-axis component (vertical component) of the motion vector.

Subsequently, operation of reproducing an image signal and video subcodes recorded in such a manner as described above to produce a panorama image will be described.

In this instance, the user will manually operate a PB button (not shown) into an on-state to reproduce a signal recorded on the video tape 16 and visually observe the viewfinder 24. Then, when a subject whose panorama image the user wants to produce is displayed in the viewfinder 24, the user will manually operate the panorama switch 17 into an on-state.

The signal reproduced from the video tape 16 by the video head 15 is inputted from the recording/reproduction amplifier 13 to the analog to digital converter 4 by way of the terminal P of the switch 3. The signal is thus converted into a digital signal by the analog to digital converter 4 and then processed by reproduction signal processing such as FM demodulation and de-emphasis by the reproduction signal processing circuit 7, whereafter it is written into the first image memory 9.

Further, the signal reproduced from the video tape 16 by the video head 15 is inputted to the video subcode processor 21 so that a video subcode illustrated in FIG. 4 is transmitted from the video subcode processor 21 to the microcomputer 18. The microcomputer 18 thus identifies a panning ID signal and motion vector information and sends out, when panning is on, the motion vector to the memory controller 20.

The memory controller 20 controls, for example, as described hereinabove with reference to FIGS. 1(a) to 1(i) and 2, extraction of an image at the first image memory and writing of an image signal into the second image memory 10 in response to the received motion vector to write a panorama image into the second image memory 10.

The panorama image stored in the second image memory is read out and converted into a composite image signal by the monitor signal processing circuit 22 and then converted into an analog image signal by the digital to analog converter 23. The analog image signal is supplied to and displayed in the viewfinder 24. Further, the analog image signal may be supplied from the video output terminal 25 to an external monitor or printer so that a panorama image may be displayed on the external monitor or by the external printer.

The reason why a panning ID signal and motion vector information are recorded as a video subcode upon recording and then utilized upon reproduction is that, if it is tried to detect a motion vector from a reproduced image signal, then the accuracy in detection of a motion vector is degraded because the signal to noise ratio of the reproduced image signal is decreased when it passes an electromagnetic transducer system including a video tape and a recording head. It is to be noted that the panorama image producing apparatus may be modified such that a panning ID signal is not recorded but the panorama switch 17a is manually operated into an on-state upon reproduction so as to produce a panorama image.

Subsequently, operation for reproducing an image signal and a video subcode signal to automatically produce a panorama image will be described with reference to FIG. 5. In this instance, the user will manually operate the mode switch 17b to put the panorama image reproducing apparatus into an automatic panorama production mode.

Figure 5:
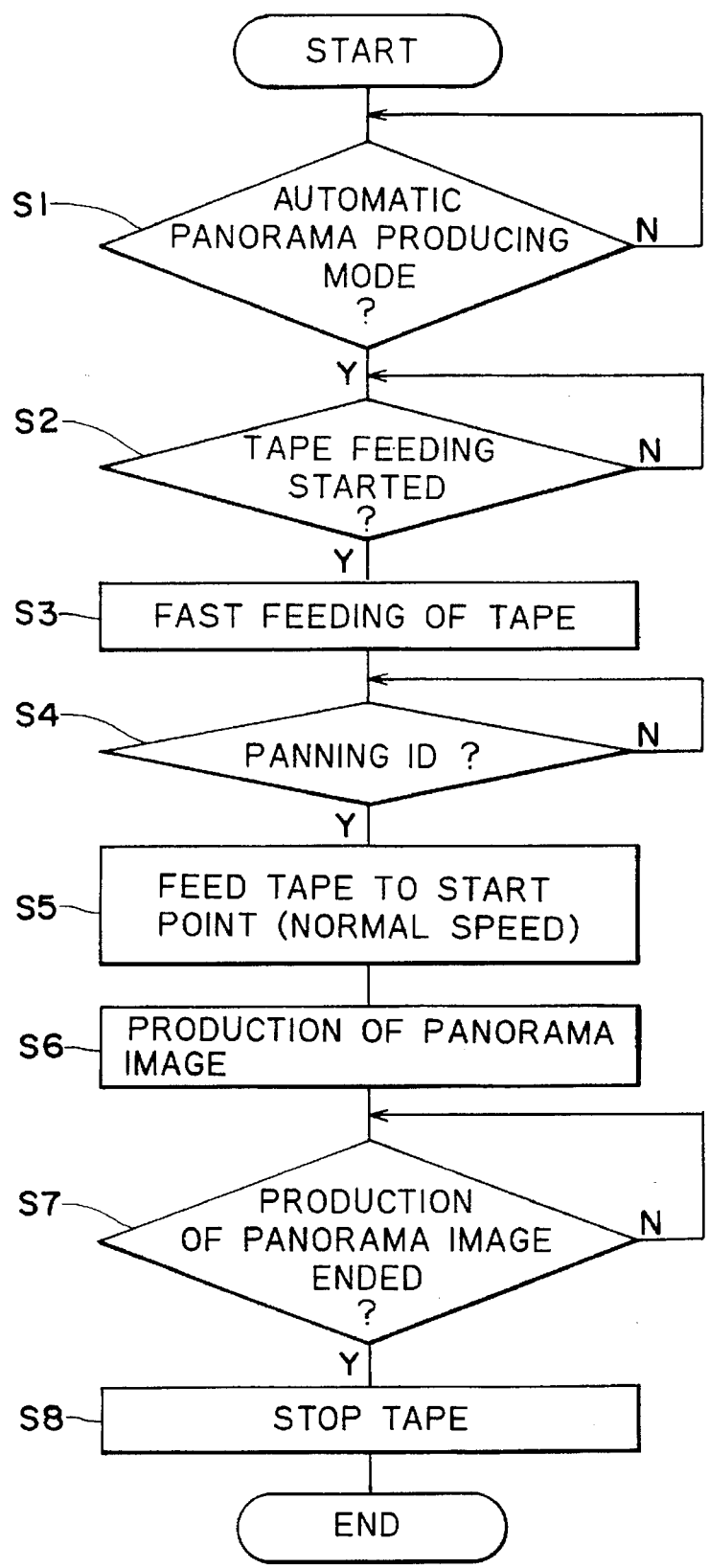
FIG. 5 is a flow chart illustrating a process of automatically producing a panorama image in the panorama image producing apparatus.

Referring to FIG. 5, the microcomputer 18 first determines whether or not the panorama image producing apparatus is in the automatic panorama production mode, and when the panorama image producing apparatus is in the automatic panorama production mode, the video tape 16 is fed fast (steps S1 to S3). Then, while the video tape 16 is being fed fast, a video subcode signal is reproduced to detect a portion at which panning-on is recorded (step S4).

After the panning-on portion is detected, the video tape 16 is fed at a normal speed in the reverse direction until a panning starting point, that is, the top of a portion for which panning-on is recorded, is reached (step S5).

Subsequently, the video tape 16 is fed at a normal speed in the forward direction to produce a panorama image (step S6).

Then, when completion of production of a panorama image is detected from the fact that the write address of the second image memory 10 comes to a value corresponding to the right end of the screen, the microcomputer 18 stops the video tape 16 and ends its processing (steps S7 and S8).

Figure 6:
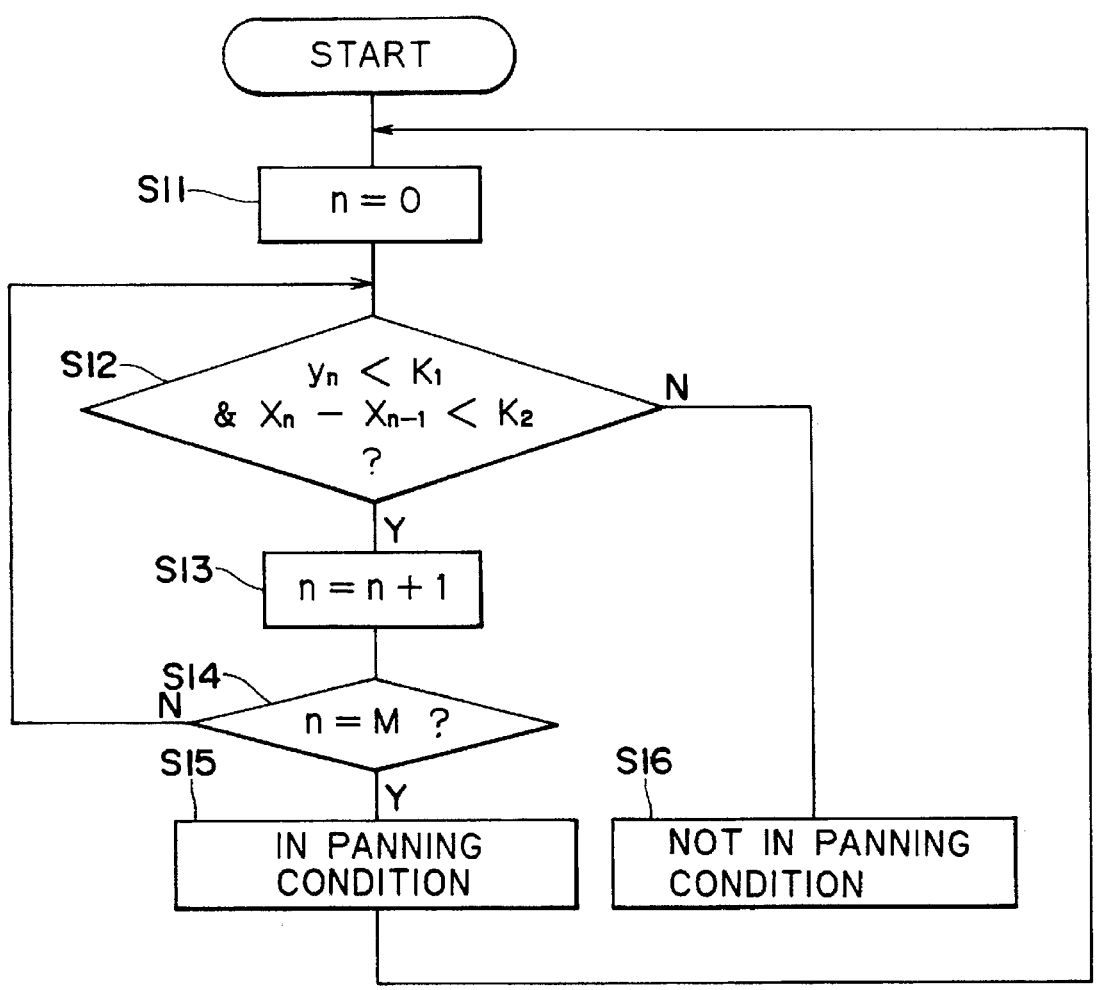
FIG. 6 is a flow chart illustrating a process of detecting a panning condition based on the output of a motion vector detector of the panorama image producing apparatus of FIG. 3.

While, in the description above, the microcomputer 18 detects, in a mode in which a panorama image is produced upon reproduction, that the panorama switch 17a is changed over to an on-state and sends out a panning ID signal to the video subcode processor 21, the panorama image producing apparatus may be modified such that the microcomputer 18 detects a panning condition from the output of the motion vector detector 19 and sends out a panning ID signal. Since the video camera-tape recorder, for example, in a panning condition, is not moved very much in a vertical direction but is moved substantially at a fixed speed in a horizontal direction, when such condition appears successively for several fields, a panning condition is discriminated by the microcomputer 18. FIG. 6 illustrates such operation.

Referring now to FIG. 6, a counter is set to n=0 (step S11). Then, it is determined whether or not a vertical component yn of the motion vector at the nth field is lower than a predetermined reference value $K_1$ and whether or not a difference of a horizontal component xn of the motion vector at the nth field and a horizontal component xn-1 of the motion vector at the n-1th field is lower than another predetermined reference value $K_2$ (step S12). Then, if the two requirements are satisfied, the value n is incremented to n=n+1, and then, if the new value n is equal to a predetermined value M (for example, 5 or 6), a panning condition is determined (steps S14 and S15). On the other hand, when the requirements at step S12 are not satisfied, a panning condition is not determined, that is, it is determined that the panorama image producing apparatus is not in a panning condition (step S16).

Subsequently, construction and operation of the motion vector detector 19 and motion vector calculation processing of the microcomputer 18 will be described.

The motion vector detector 19 in the present embodiment detects a motion vector using an improved method of the representative point matching method. First, the representative point matching method will be described briefly with reference to FIG. 7.

For example, five areas A1 to A5 for detection of a motion vector are set in a screen A. Each area is constituted from a block B including K×L picture elements, and a representative point R is set, for example, at the center of the area. Each block B is a range within which the representative point R may possibly move within a one field period.

A motion vector of the screen A is calculated by calculating motion vectors in the areas A1 to A5 and processing the motion vectors of the areas A1 to A5. For example, the motion vector in the area A2 is detected by detecting to where the K×L representative points R in the area A2 have moved for a one field period. To this end, an absolute value of a difference between an image signal Sn(0, 0) in the nth field of the representative point R in each block B and another image signal Sn+1(i, j) in the n+1th field of a point displaced by i in the vertical direction and by j in the horizontal direction from the representative point R is calculated to calculate a correlation value p(i, j) of the block. Then, such correlation value p(i, j) of the block is cumulatively added for the displacements (i, j) in all of the K×L blocks to calculate a correlation value P(i, j) of the area A2. The displacement (i, j) at which the correlation value P(i, j) presents its minimum value is determined as a motion vector of the area A2.

Detection of a motion vector by the representative point matching method is advantageous in that, since it requires calculation of motion only of representative points sampled out from the screen A, the amount of calculation is reduced significantly comparing with the all point matching method wherein a motion vector is detected using all picture elements in the screen A. However, where different movements of a subject are present, when the signal to noise ratio of the image signal is low or when the variations in pattern of the image around representative points are little, an accurate motion vector cannot be detected.

Thus, in the present embodiment, only those of the K×L representative points in each of the areas A1 to A5 with regard to which the variations in pattern of the image therearound are greater than a predetermined value are used for motion vector detection. Detection of a variation in pattern is performed by calculating a Laplacian $\Delta$ of the image at each representative point. The calculation is performed, if it is assumed that the representative point is, for example, in the vth line and the hth dot of the screen, using the following equation:

$\Delta = S(h+1,v) + S(h-1,v) + S(h, v+1) +$ $S(h, v-1) - 4 \times S(h, v)$

As can be seen from the equation above, since the Laplacian $\Delta$ corresponds to a difference between an image of the representative point and an average value among adjacent images around the representative point, the value of the Laplacian $\Delta$ represents a magnitude of the pattern of the images around the representative point. In the present embodiment, among the K×L representative points in each of the areas A1 to A5, those representative points whose Laplacians $\Delta$ exceed a predetermined value are used for motion vector detection, and accordingly, accurate detection of a motion vector can be achieved.

Figure 7:
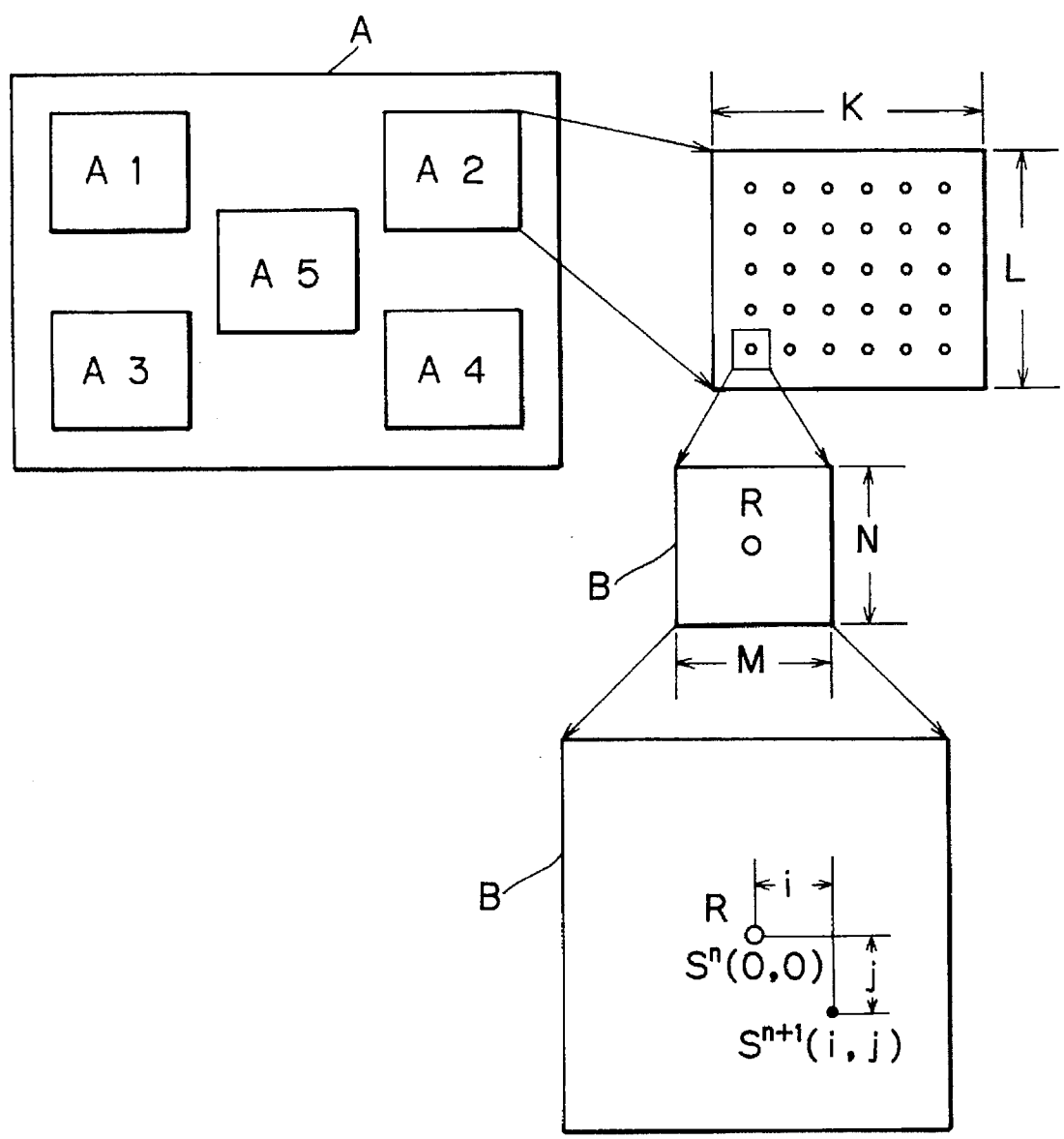
FIG. 7 is a diagrammatic view illustrating motion vector detection based on the representative point matching method.
Figure 8:
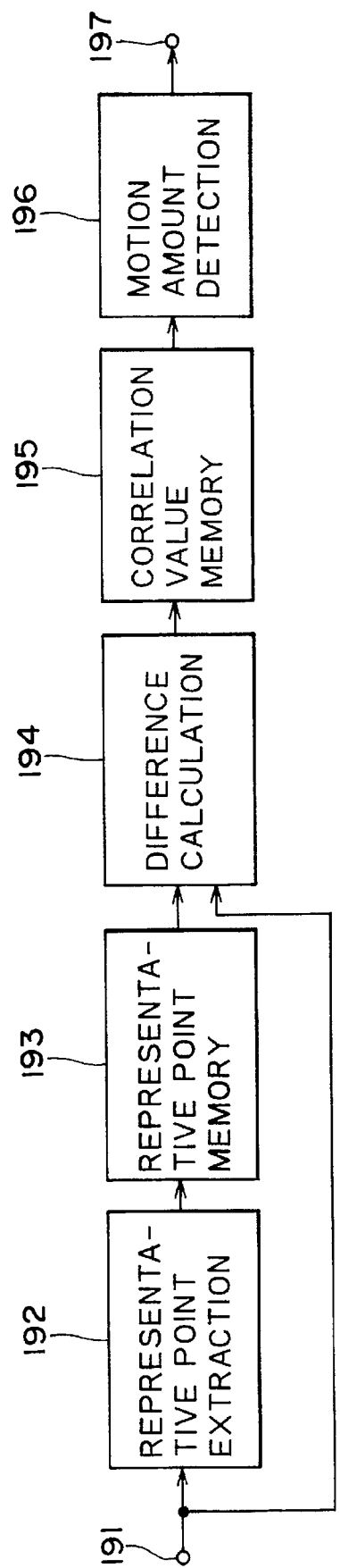
FIG. 8 is a block diagram showing a detailed construction of a motion vector detector in the panorama image producing apparatus of FIG. 3.

FIG. 8 shows a construction of the motion vector detector in the present embodiment. In the following, operation of the motion vector detector will be described with reference to FIGS. 7 and 8.

Image signals of representative points R shown in FIG. 7 are successively inputted to an input-terminal 191 and supplied to a representative point extraction circuit 192, in which Laplacians Δ are calculated. Then, only those image signals of the representative points whose Laplacians Δ exceed a predetermined value are stored into a representative point memory 193. Here, the representative point extraction circuit 192 is constituted from a combination of, for example, a one-line delay circuit, a one-dot delay circuit, an adder, a subtractor, an amplifier, a comparator and so forth.

Subsequently, a difference calculation circuit 194 calculates an absolute value of a difference between the image signal Sn(0, 0) of each representative point stored in the representative point memory 193 and another image signal Sn+1(i, j) of the representative point in the next field to calculate a correlation value p(i, j) of each block and cumulatively adds such correlation values p(i, j) for each displacement (i, j) of all of the blocks to calculate a correlation value P(i, j) of the area. Then, a result of the calculation is stored into a correlation value memory 195.

Finally, a motion amount detection circuit 196 calculates, from correlation values P(i, j) stored in the correlation values 195, a displacement (i, j) at which the correlation value P(i, j) exhibits a minimum value. The displacement (i, j) is calculated for all of the areas A1 to A5 and outputted from an output terminal 197 to the microcomputer 18 of FIG. 3. It is to be noted that, while a total of five areas A1 to A5 are set here, the number and the pattern of such areas can be set arbitrarily.

Subsequently, motion vector calculation processing of the microcomputer 18 will be described.

Figure 9:
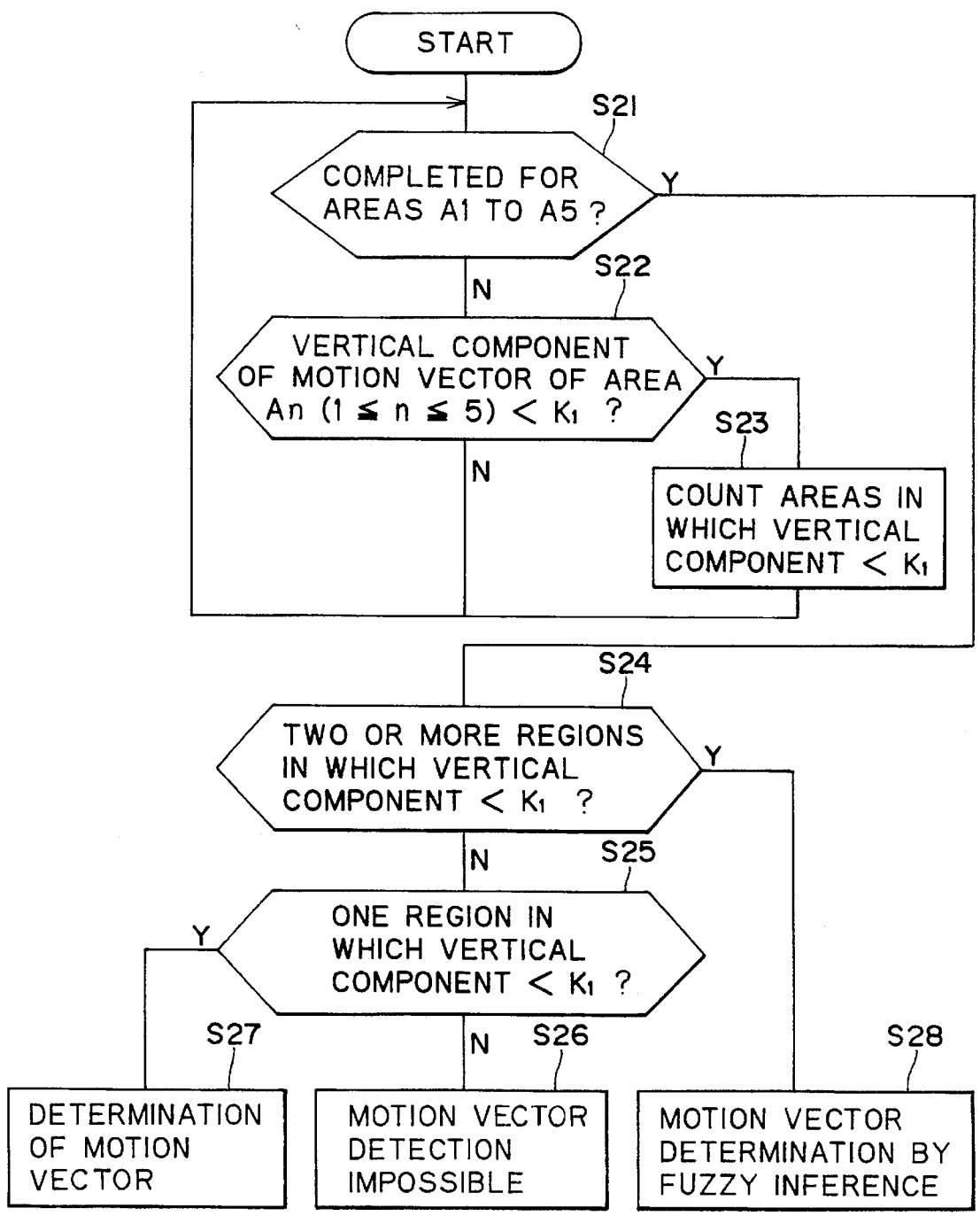
FIG. 9 is a flow chart illustrating motion vector calculation processing of a microcomputer of the panorama image producing apparatus of FIG. 3.

The microcomputer 18 executes processing for enhancing the accuracy in motion vector detection making use of the characteristic of the panorama image producing apparatus. In particular, since a subject is photographed, when a panorama image is to be produced, while normally panning the video camera-tape recorder, the video camera-tape recorder is not moved very much in a vertical direction but is moved substantially at a fixed speed in a horizontal direction. Thus, those of motion vectors of the areas A1 to A5 detected by the motion vector detector 19 whose vertical component is smaller than a predetermined value is determined to be a correct motion vector. It is to be noted that, when the video camera-tape recorder is tilted to produce a panorama image, those motion vectors whose horizontal components are lower than a predetermined value are determined to be correct motion vectors. In the following, motion vector calculation processing of the microcomputer 18 when the video camera-tape recorder is panned to produce a panorama image will be described with reference to FIG. 9.

First, the microcomputer 18 discriminates from motion vectors of the areas A1 to A5 outputted from the motion vector detector 19 whether vertical components of the motion vectors are lower than a predetermined value $K_1$ (≈0), and then counts the number of those areas in which the vertical component is lower than the predetermined value $K_1$ (steps S21 to S23).

Then, when the number of those areas in which the vertical component of the motion vector is lower than the predetermined value $K_1$ is equal to or greater than 2, it is discriminated which one or ones of the areas exhibit a correct motion vector or vectors to determine a motion vector based on fuzzy determination (steps S24 and S28). Using, for example, parameters of an average value Av, a minimum value Min and an inclination θ of correlation values P(i, j) of displacements (i, j), a membership function is produced based on the rule that, 1. when Min/Av is low, the motion vector calculated for the area is probable, and 2. when θ is high, the motion vector calculated for the area is probable, and the probability of the motions calculated from the two or more areas is determined.

On the other hand, when the number of those areas in which the vertical component of the motion vector is low than the predetermined value $K_1$ is 1, the motion vector in the area is determined to be a correct motion vector (steps S24, S25 and S27).

Else, when the number of those areas in which the vertical component of the motion vector is lower than the predetermined value $K_1$ is neither equal to or greater than 2 nor equal to 1, detection of a motion vector is impossible (steps S24, S25 and S26). In this instance, motion vector data of the preceding field are maintained.

When the video camera-tape recorder is tilted to produce a panorama image, the number of those areas in which the horizontal component of the motion vector is lower than a predetermined value $K_2$ (≈0) is counted, and quite similar processing is performed using the count value to detect a motion vector.

A motion vector calculated in such a manner as described above by the microcomputer 18 is outputted to the memory controller 20, and consequently, a panorama image with a high degree of accuracy can be produced by the memory controller 20.

It is to be noted that the motion vector detector may be replaced by a motion vector detector based on the conventional representative point matching method. Further, an angular velocity sensor may be provided additionally such that a motion vector may be discriminated with reference to the output of the angular velocity sensor.

The panorama image producing apparatus described hereinabove with reference to FIG. 3 may operate in a different panorama image producing principle according to the present invention. The panorama image producing principle will be described subsequently with reference to FIGS. 10(a) to 10(i).

Figure 10A:
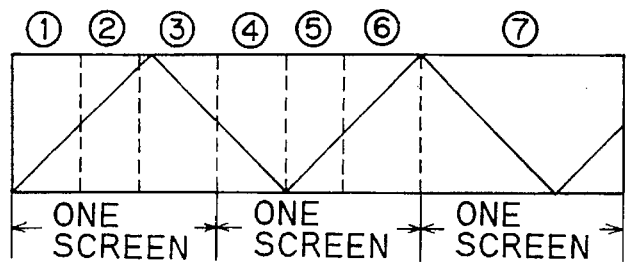
FIGS. 10(a) to 10(i) are diagrammatic views illustrating another principle of production of a panorama image according to the present invention.

Referring first to FIG. 10(a), there is shown a relationship between a subject and an image. Here, similarly to the case of FIG. 1(a), the subject includes a regular repeat pattern of a triangle and is shown for three screens in a horizontal direction. Numbers in circles indicated at the top of FIG. 10(a) represent field numbers when panning is performed from the left to the right of the subject. In short, while the field of view moves by a six field distance from the first field to the seventh field, panning for two screens is performed. Then, a single panorama image is produced from the images of the two screens.

Figure 10B:
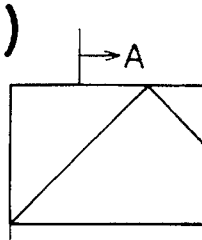

FIG. 10(b) shows an image of the first field. The image is written into an image memory while being reduced in both of a horizontal direction and a vertical direction. Such reduction in size is performed in order to allow a panorama image from two screens to be produced in one screen. FIG. 10(f) shows the image thus written in the image memory. The top and bottom portions of the screen each having one fourth height are blanked while the image is written into the remaining central portion of the screen having one half height. Here, the image is written into a portion of the remaining central portion of the screen which has a width M from the left end of the screen. In order to reduce the image of FIG. 10(b) to one half in size in the horizontal and vertical directions, the image memory is used. For example, such reduction in size can be realized by writing the image of FIG. 10(b) into another image memory and then supplying every other read address to the image memory upon reading.

Figure 10C:
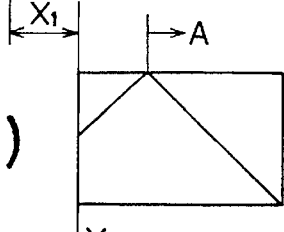

FIG. 10(c) shows an image of the second field. Since the image of the second field is displaced by a distance $x_1$ in the horizontal direction from the image of the first field, the image of the second field is written into a portion of the image memory displaced by $x_1/2$ in the horizontal direction. FIG. 10(g) shows the image written in the image memory. Here, the image is written in a portion of the width of M of the image memory beginning with the position displaced by $x_1/2$ from the left end of the screen in FIG. 10(g). Accordingly, the image which has been written in the first field remains only at a portion thereof having a width $x_1/2$ from the left end of the screen.

Figure 10D:
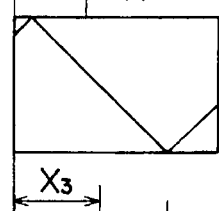
Figure 10E:
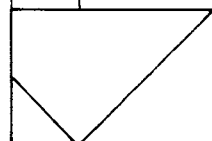
Figure 10F:
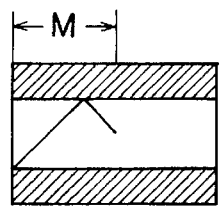
Figure 10G:
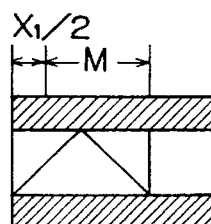
Figure 10H:
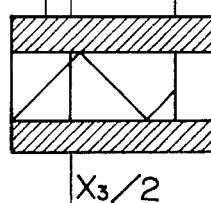
Figure 10I:
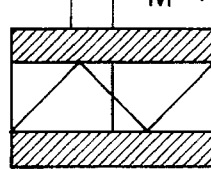
Figure 11A:
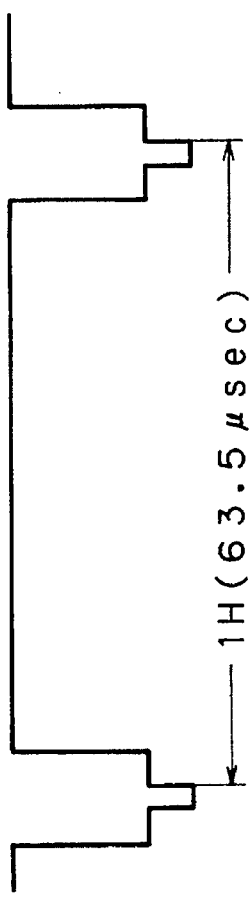
FIG. 11 is a time chart illustrating the timing relationship between a write enable signal in a horizontal direction for an image memory and an image signal for a one horizontal scanning period in the production of a panorama image illustrated in FIGS. 10(a) to 10(i)
Figure 11B:
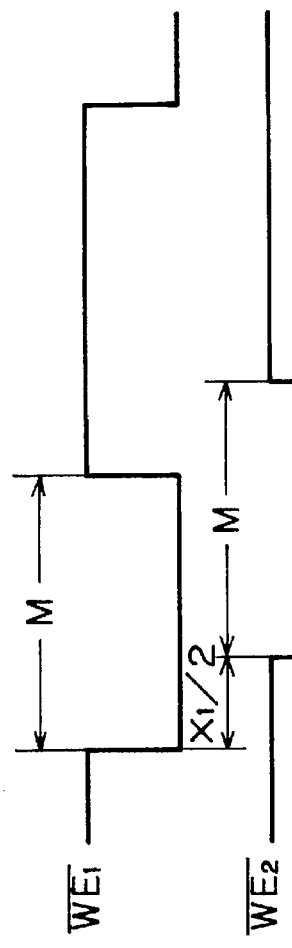
Figure 11C:
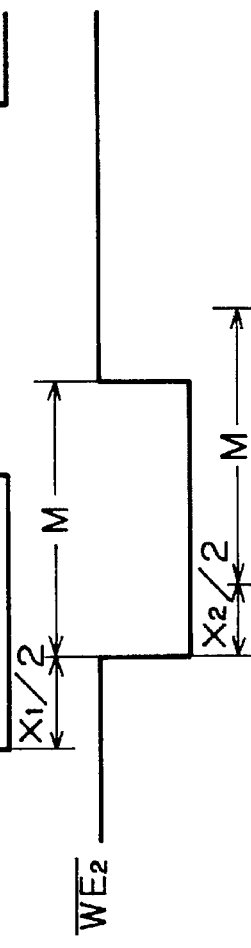
Figure 11D:
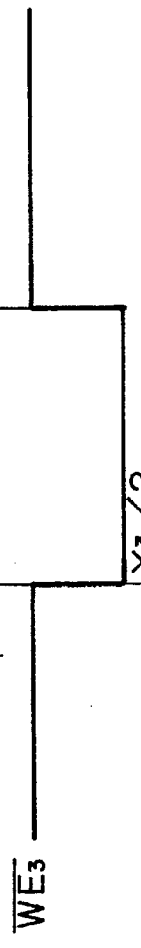
Figure 11E:
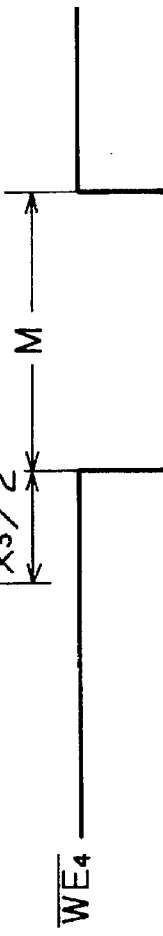

Similarly, FIG. 10(d) shows an image of the third field. Since the image of the third field is displaced by a distance $x_2$ in the horizontal direction from the image of the second field, the image is written into a portion of the image memory which is further displaced by $x_2/2$ from the left end of the position at which the image has been written into the image memory at the stage of FIG. 10(g). FIG. 10(h) shows the image written in the image memory. Here, the image is written in a portion of the width of M of the image memory from the position displaced by $(x_1+x_2)/2$ from the left end of the screen. Accordingly, the image which has been written in the second field remains only at a portion thereof which has the width of $x_2/2$.

By repeating such a sequence of operations as described above up to the seventh field, a panorama image from two screens can be produced in one screen. Here, completion of writing of a panorama image can be detected from the fact that the write address for the image memory reaches a value corresponding to the right end of the screen or from a timing of a write enable signal which will be hereinafter described. It is to be noted that representations of the fifth and following screens are omitted in the drawings.

FIG. 11 is a time chart illustrating the timing relationship between a write enable signal (WE: indicated in the negative logic in FIG. 11) for the image memory described above with reference to FIGS. 10(a) to 10(i) and an image signal for a one horizontal scanning period. The waveform (a) in FIG. 11 shows the image signal while the waveforms (b) to (e) show write enable signals $\overline{WE_1}$ to $\overline{WE_4}$ for the first to fourth fields of FIG. 10(a), respectively. When any of the write enable signals is at the low level, writing into the image memory is performed.

Also with regard to the vertical direction, such writing control as seen from FIGS. 10(f) to 10(i) can be achieved by applying a similar write enable signal to the image memory.

In this manner, according to the second principle of the present invention, since images are successively written in an overlapping relationship, that is, overwritten, into different portions of the image memory displaced by a distance corresponding to the amount of movement of the image, the images having widths corresponding to amounts of movement of the image are joined together to make up a panorama image.

Referring now to FIG. 12, there is shown a modification to the panorama image producing apparatus of FIG. 3. While the panorama image producing apparatus of FIG. 3 produces, where it is constructed in accordance with the principle of the present invention described hereinabove with reference to FIGS. 1(a) to 1(i) and 2, a panorama image using an image at a central portion of the lens (not shown) which forms an image of a subject on the CCD imaging element 1, the modified panorama image producing apparatus of FIG. 12 is improved in that the extraction position and the extraction width in each screen can be set to a desired position and a desired width, respectively. To this end, the modified panorama image producing apparatus additionally includes a screen dividing mode switch 17c. Further, the modified panorama image producing apparatus allows use of an automatic panning tilter or a like apparatus on the market so that panning may be performed at a predetermined speed to produce a panorama image.

FIGS. 13(a) to 13(i) illustrate a first screen dividing mode of the modified panorama image producing apparatus of FIG. 12.

Figure 13A:
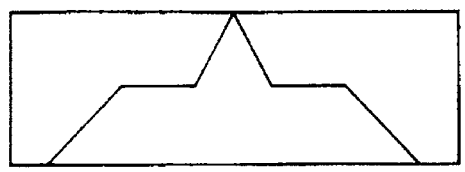

FIG. 13(a) illustrates the relationship between a subject and an image. Here, the subject is a pattern composed of a trapezoid and a triangle and is shown for two screens in a horizontal direction. Here, it is assumed that panning is performed at a fixed speed from the left to the right. In this instance, the modified panorama image producing apparatus is set in position on an automatic panning tilter (not shown), and the mode switch 17b will be manually operated to set the panorama image producing apparatus to an automatic panning mode.

FIGS. 13(b) to 13(h) show images at the first to seventh fields and portions of the image memory into which the images are stored, respectively. In each of the first to the third fields, a ⅙ portion at the left end of the screen is written into the image memory. Then in the fourth field, the entire screen is written into the image memory. Then, in each of the fifth to the seventh field, a ⅙ portion at the right end of the screen is written into the image memory.

Figure 13I:
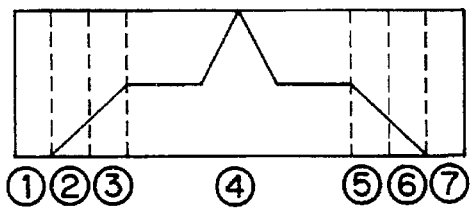
Figure 15A:
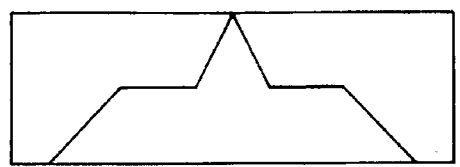
FIGS. 15(a) to 15(i) are diagrammatic views illustrating a second screen dividing mode of the panorama image producing apparatus of FIG. 12.
Figure 15B:
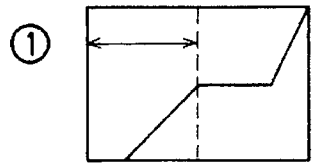
Figure 15C:
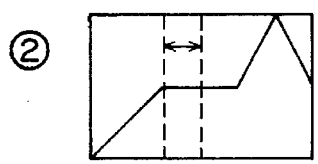
Figure 15D:
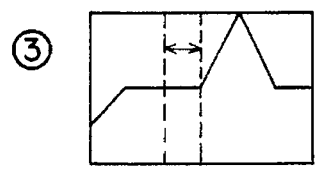
Figure 15E:
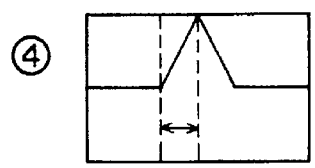
Figure 15F:
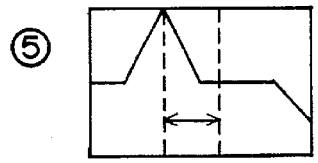
Figure 15G:
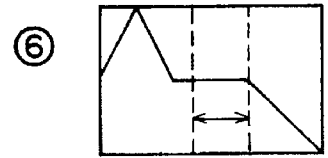
Figure 15H:
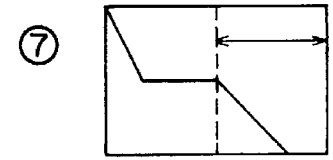
Figure 15I:
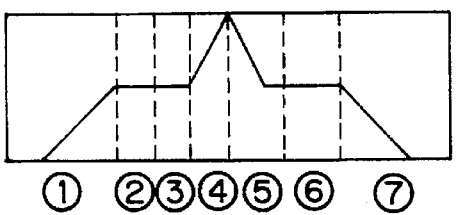
Figure 16A:
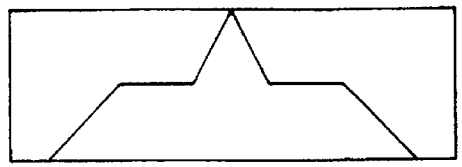
Figure 16I:
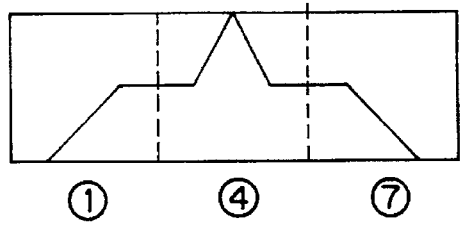

FIG. 13(i) shows a panorama image written in the image memory. Here, the panorama image shown is produced without reducing the original image in size. In this instance, since reduction processing employing the image memory is not performed, the memory controller 20 must only supply, to the first image memory 9, a write enable signal for enabling only a predetermined portion of an image signal in a horizontal scanning period to be written and a memory address corresponding to a writing position. Thus, a panorama image signal is written into the first image memory 9.

FIG. 14 is a time chart illustrating the relationship of an image signal in the first, fourth and seventh fields and corresponding write enable signals $\overline{WE_1}$, $\overline{WE_4}$ and $\overline{WE_7}$ (indicated in the negative logic in FIG. 14). Where an automatic panning tilter or a like apparatus is used in this manner, if a screen dividing mode is determined, then a joining portion of an image is determined, and consequently, the writing timing and the write address for writing into the image memory are determined.

The first screen dividing mode is effective when the user attaches importance to the picture quality of a central portion of a panorama image. It is to be noted that, where an automatic panning tilter or a like apparatus is not used, the timing and the width of a write enable signal may be determined in response to a motion vector of an image.

FIGS. 15(a) to 15(i) illustrate a second screen dividing mode while FIGS. 16(a) to 16(i) illustrate a third screen dividing mode of the panorama image producing apparatus of FIG. 12. It is to be noted that, since description of details of the figures overlaps with the description of the first screen dividing mode given above, overlapping description of such details is omitted to avoid redundancy, and only characteristics of the screen dividing modes will be described below.

In the second screen dividing mode, a left half and a right half of the screens in the first and seventh fields are used to produce a ¼ left end portion and a ¼ right end portion of a panorama image while a central ½ portion of the panorama image is produced using portions of the screens of the remaining second to sixth fields. In the present second screen dividing mode, since an image at a central portion of the lens is used for each of the second to sixth fields, each joining portion between images corresponds to a central portion of the lens, and no joining portion is provided corresponding to an end of the lens. Consequently, a panorama image free from a significant amount of distortion and having a generally high picture quality can be obtained.

In the third screen dividing mode, one third of each of the three first, fourth and seventh fields is used to make up a panorama image. In the present mode, the panorama image includes a comparatively smaller number of, only two, joining portions, and accordingly, it can be produced readily. However, the distortion at a joining portion may be significant comparing with that produced in the first or second screen dividing mode.

Thus, with the modified panorama image producing apparatus, since the positions of and the widths between joining portions of a panorama image can be varied by changing the screen dividing mode in accordance with a photographed image, a panorama image of a high picture quality can be obtained.

It is to be noted that, while several methods of forming a panorama image have been described with reference to FIGS. 1(a) to 1(i), 10(a) to 10(i), 13(a) to 13(i), 15(a) to 15(i) and 16(a) to 16(i), any of panorama image forming methods described above and described blow may be employed. In particular, images of three or more screens may be composed into a single panorama image. Further, without providing blanks at the top and the bottom of the screen, two successive panorama images may be formed, for example, at upper and lower halves of the screen. This allows production of a panorama image over 360 degrees. Further, each screen may be written into the image memory without being reduced in size. In this instance, a panorama image may be formed on paper or the like using a printer or may be displayed by scroll displaying on a monitor. Further, panning may be performed from the right to the left or from the top to the bottom of the screen to produce a panorama image. Further, an image at a central portion or at a right end portion of each screen may be used, or else, images at different portions of the screens may be combined suitably such that, for example, an image at a central portion of a screen is used for a central portion of a panorama image while a left end portion or a right end portion of an image is used for a peripheral portion of the panorama image similarly as in FIGS. 13(a) to 13(i). Or otherwise, for example, a central portion of a panorama image may be produced from a single image. Furthermore, when motion of the image in a vertical direction cannot be ignored, the writing position in the vertical position at different stages may be changed in response to motion of the image in the vertical direction. Further, a panorama image can be produced also if, in place of overwriting images into portions of the image memory displaced by distances corresponding to the amounts of movement of the image, portions having widths corresponding to the amounts of movement of the image may be sampled out and written into the image memory similarly as in FIGS. 1(a) to 1(i). Furthermore, a panorama image can be produced also if, in place of extracting the portions of the widths $x_0$ to $x_3$ of the image and writing them into the image memory at the stages of FIGS. 1(f) to 1(i), the left half of the image in FIG. 1(b) may be written into the image memory at the stage of FIG. 1(f) while the left half of the image in FIG. 1(c) is written into the image memory beginning with the position displaced by $x_1/2$ rightwardly at the stage of FIG. 1(g), whereafter the left half of the image in FIG. 1 (D) is written into the image memory beginning with the position further displaced by $x_2/2$ rightwardly at the stage of FIG. 1(h), and thereafter, writing into the image memory is successively performed up to the seventh field displacing the writing position in accordance with the amount of motion of the image in a similar manner.

Figure 17:
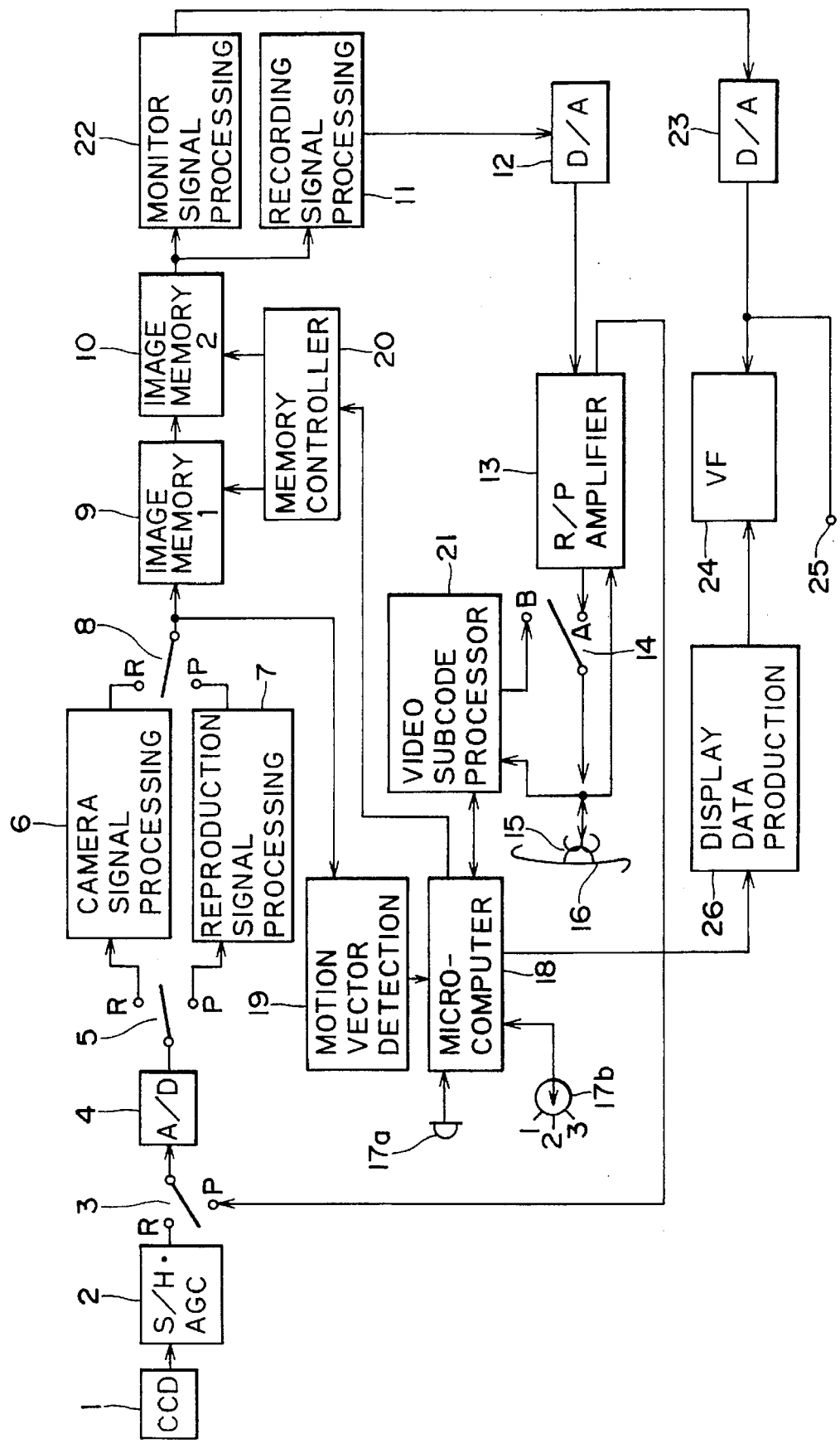
FIG. 17 is a block diagram showing another modified panorama image producing apparatus.

Referring now to FIG. 17, there is shown another modification to the panorama image producing apparatus of FIG. 3. The panorama image producing apparatus of FIG. 17 is an improvement of the panorama image producing apparatus of FIG. 3 in that, when the video camera-tape recorder is, upon photographing, panned from the left to the right of a subject or tilted from the top to the bottom of a subject to perform panorama photographing, a proceeding condition of panorama photographing can be visually observed. To this end, the modified panorama image producing apparatus is constructed such that it calculates an amount of motion of an image after the point of time at which panorama photographing is started and another amount of motion necessary for production of a panorama image and discriminates and displays, in accordance with the amounts of motion thus calculated, a proceeding condition of panorama photographing in the viewfinder or on some other display element. Such construction can be realized, for example, by calculating the number of picture elements in a horizontal direction of a panorama image to be produced and a sum total of the amounts of motion in the horizontal direction of the image after starting of panorama photographing as represented in units of a picture element and calculating and displaying the ratio between them. In the case illustrated in FIGS. 1(a) to 1(i), the number of picture elements in the horizontal direction of the panorama image is the number of picture elements in the horizontal direction in FIGS. 1(b) to 1(e) or the number of picture elements in the horizontal direction in FIGS. 1(f) to 1(i), and the sum total of the amounts of motion in the horizontal direction of the image after starting of panorama photographing is 0 in FIG. 1(b), $x_1$ in FIG. 1(c), $x_1+x_2$ in FIG. 1(d), and $x_1+x_2+x_3$ in FIG. 1(e). The calculations are performed by the microcomputer 18, and a result of such calculation from the microcomputer 18, that is, a ratio mentioned above, is supplied to a display data producing unit 26 so that the proceeding condition of panorama photographing may be displayed in the viewfinder 24.

Subsequently, operation of the panorama image producing apparatus for displaying the proceeding condition of panorama photographing in the viewfinder will be described.

When the panorama switch 17a is turned on, the microcomputer 18 calculates an amount of motion in a horizontal direction of an image in response to the output of the motion vector detector 19. Then, the microcomputer 18 calculates a number of picture elements in the horizontal direction necessary to produce a panorama image and a sum total of the amount of motion in the horizontal direction of the image after starting of panorama photographing, and supplies resulted values to the display data producing unit 26. The display data producing unit 26 thus produces display data from the values supplied thereto from the microcomputer 18 and supplies the display data to the viewfinder 24 so that the display data are displayed in the viewfinder 24.

Figure 18A:
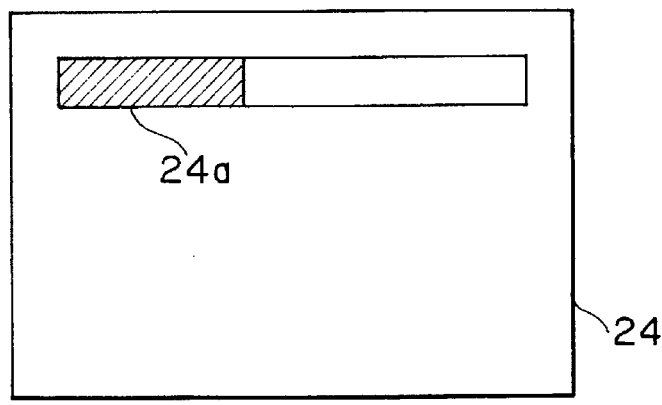
FIGS. 18(a) to 18(d) are diagrammatic views showing an example of a display of a proceeding condition of panorama photographing in the panorama image producing apparatus of FIG. 17.
Figure 18B:
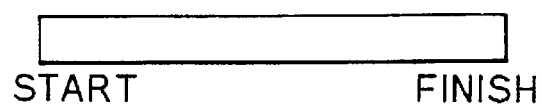
Figure 18C:
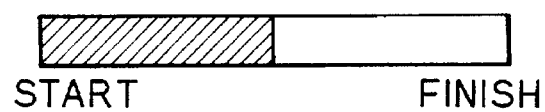
Figure 18D:
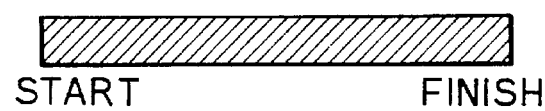

FIGS. 18(a) to 18(d) illustrate an example of a manner of displaying a proceeding condition of panorama photographing in the modified panorama image producing apparatus of FIG. 17. Here, the proceeding condition of panorama photographing is displayed in the form of a horizontal bar 24a at an upper portion of the screen of the viewfinder 24 as seen in FIG. 18(a). Upon starting of photographing, only a framework is displayed as seen in FIG. 18(b), and when the video camera-tape recorder is moved, the bar 24a is extended as seen in FIG. 18(c) in proportion to the amount of movement of the image. Then, when the video camera-tape recorder is moved by an amount sufficient to produce a panorama image, the bar is extended to the full length as seen in FIG. 18(d). The length of the bar 24a here is controlled by the display data produced from the display data producing unit 26. It is to be noted that, when panning is performed from the right to the left of the screen, the bar 24a is displayed so that it may be extended from the right to the left, but when the video camera-tape recorder is tilted from the top to the bottom of the screen, the bar 24a is displayed so that it may be extended from the top to the bottom of the screen. Further, when a panorama image is to be produced from three or more screens, the rate at which the bar 24a is extended should be varied in accordance with the number of screens to form a panorama image.

It is to be noted that the form of displaying a proceeding condition of panorama photographing in the viewfinder is not limited to such a bar graph as described above but may be any displaying form such as a circle graph only if such proceeding condition can be visually observed from it.

Or, a proceeding condition of panorama photographing may alternatively be displayed by way of sound. In this instance, for example, the frequency of sound may be varied in response to the proceeding condition of panorama photographing.

It is to be noted that the present invention is not limited to the specific embodiment and the modifications described above and such various modifications and alterations as listed below can be made any of to the embodiment and the modifications.

1. While writing into the image memories is performed for each one field in the embodiment and the modifications described above, since the position of the scanning line is displaced in a vertical direction between an odd-numbered field and an even-numbered field, alternatively the image signal only of one of the fields may be written into the image memories.
2. When a panorama image signal produced by writing the screens in FIGS. 1(b) to 1(e) and so forth into the second image memory while reducing the size of them is read out from the second image memory, it may be increased into the original size. In this instance, either the panorama image is formed on paper or the like using a printer or is displayed by scrolling displaying on a monitor.
3. Only a mode in which a panorama image is formed upon reproduction may be provided. Or, a panorama image may be produced from an input image signal inputted in a line.
4. A panning ID signal and motion vector information may be recorded in a vertical blanking period of an image signal or in a longitudinal direction of a video tape.
5. An additional mode wherein panning is performed at a fixed speed using an automatic panning tilter or a like apparatus may be provided. In this instance, since the width over which an image is extracted in FIGS. 1(c) to 1(e) and so forth depends upon the panning speed of the automatic panning tilter, the motion vector detector may be inoperative.
6. The present invention may be applied to a recording apparatus or a reproducing apparatus for exclusive use for recording or reproduction.
7. A panorama image obtained may be recorded onto a rotary recording medium such as a magnetic disk or a magneto-optical disk.
8. A motion vector may be detected by means of an angular velocity sensor.

Having now fully described the invention, it will be apparent to one of ordinary skill in the art that many changes and modifications can be made thereto without departing from the spirit and scope of the invention as set forth herein.

What is claimed is:

1. An apparatus for recording a panorama image, comprising:

imaging means for imaging a subject to produce an image signal;

motion detecting means for detecting motion of an image from said image signal;

joining means for joining a plurality of images formed from said image signal to produce a panorama image;

calculating means for calculating, in response to the motion detected by said motion detecting means, a cumulative amount of motion of the image after a point in time at which imaging for production of a panorama image is started and for calculating a total amount of motion of the image necessary to produce said panorama image; and displaying means for displaying a proceeding condition of imaging relative to a completion condition of imaging in response to the cumulative amount of motion and the total amount of motion calculated by said calculating means.

2. An apparatus according to claim 1, wherein said motion detecting means includes a motion vector detector for detecting a motion vector between images of different fields by image processing.

3. An apparatus according to claim 1, wherein said motion detecting means includes an angular velocity sensor.

4. An apparatus according to claim 1, wherein said displaying means includes a viewfinder in which the proceeding condition of imaging for production of said panorama image is displayed.

5. An apparatus according to claim 1, wherein said proceeding condition represents the cumulative amount of motion calculated relative to the total amount of motion necessary to produce said panorama image.

6. A method of recording a panorama image, comprising the steps of:

imaging a subject to produce an image signal;

detecting motion of an image from said image signal;

joining a plurality of images formed from said image signal to produce a panorama image;

calculating from the detected motion of said image a cumulative amount of motion of the image after a point in time at which imaging for production of a panorama image is started;

calculating a total amount of motion of the image necessary to produce said panorama image; and displaying a proceeding condition of imaging relative to a completion condition of imaging in response to the calculated cumulative amount of motion and the calculated total amount of motion.

7. The method according to claim 6, wherein said proceeding condition represents the cumulative amount of motion calculated relative to the total amount of motion necessary to produce said panorama image.

* * * * *